(12) United States Patent
Huang et al.

(10) Patent No.: US 6,631,325 B1
(45) Date of Patent: Oct. 7, 2003

(54) COMPUTER IMPLEMENTED EMPIRICAL MODE DECOMPOSITION METHOD APPARATUS, AND ARTICLE OF MANUFACTURE UTILIZING CURVATURE EXTREMA

(75) Inventors: Norden Eh Huang, Bethesda, MD (US); Zheng Shen, Etobicoke (CA)

(73) Assignee: The United States as represented by the Administrator of the National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 09/082,523

(22) Filed: May 21, 1998

Related U.S. Application Data

(63) Continuation of application No. 08/872,586, filed on Jun. 10, 1997, now Pat. No. 5,983,162.
(60) Provisional application No. 60/023,411, filed on Aug. 14, 1996, and provisional application No. 60/023,822, filed on Aug. 12, 1996.

(51) Int. Cl.[7] ............................................. G06F 19/00
(52) U.S. Cl. ............................................. 702/3; 702/15
(58) Field of Search .............................. 702/4, 15, 16, 702/17, 3, 2

(56) References Cited

U.S. PATENT DOCUMENTS 4,853,903 A * 8/1989 Linville, Jr. et al. .......... 702/17
4,860,265 A * 8/1989 Laster et al. ................. 702/17
5,983,162 A * 11/1999 Huang .......................... 702/4

* cited by examiner

Primary Examiner—Donald E. McElheny, Jr.
(74) Attorney, Agent, or Firm—Keith L. Dixon

(57) ABSTRACT

A computer implemented physical signal analysis method is includes two essential steps and the associated presentation techniques of the results. All the steps exist only in a computer: there are no analytic expressions resulting from the method. The first step is a computer implemented Empirical Mode Decomposition to extract a collection of Intrinsic Mode Functions (IMF) from nonlinear, nonstationary physical signals based on local extrema and curvature extrema. The decomposition is based on the direct extraction of the energy associated with various intrinsic time scales in the physical signal. Expressed in the IMF's, they have well-behaved Hilbert Transforms from which instantaneous frequencies can be calculated. The second step is the Hilbert Transform. The final result is the Hilbert Spectrum. Thus, the invention can localize any event on the time as well as the frequency axis. The decomposition can also be viewed as an expansion of the data in terms of the IMF's. Then, these IMF's, based on and derived from the data, can serve as the basis of that expansion. The local energy and the instantaneous frequency derived from the IMF's through the Hilbert transform give a full energy-frequency-time distribution of the data which is designated as the Hilbert Spectrum.

36 Claims, 41 Drawing Sheets

(8 of 41 Drawing Sheet(s) Filed in Color)

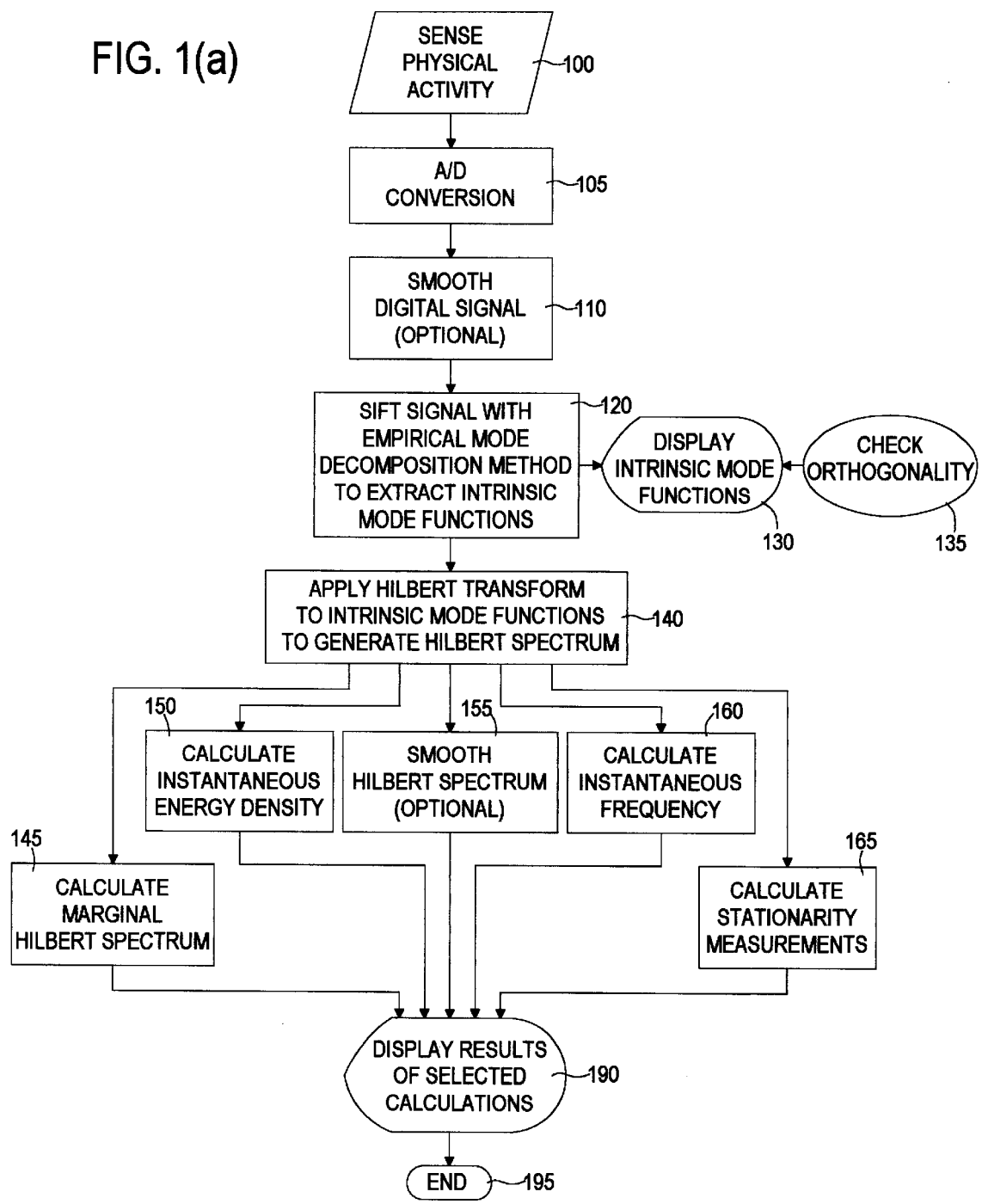

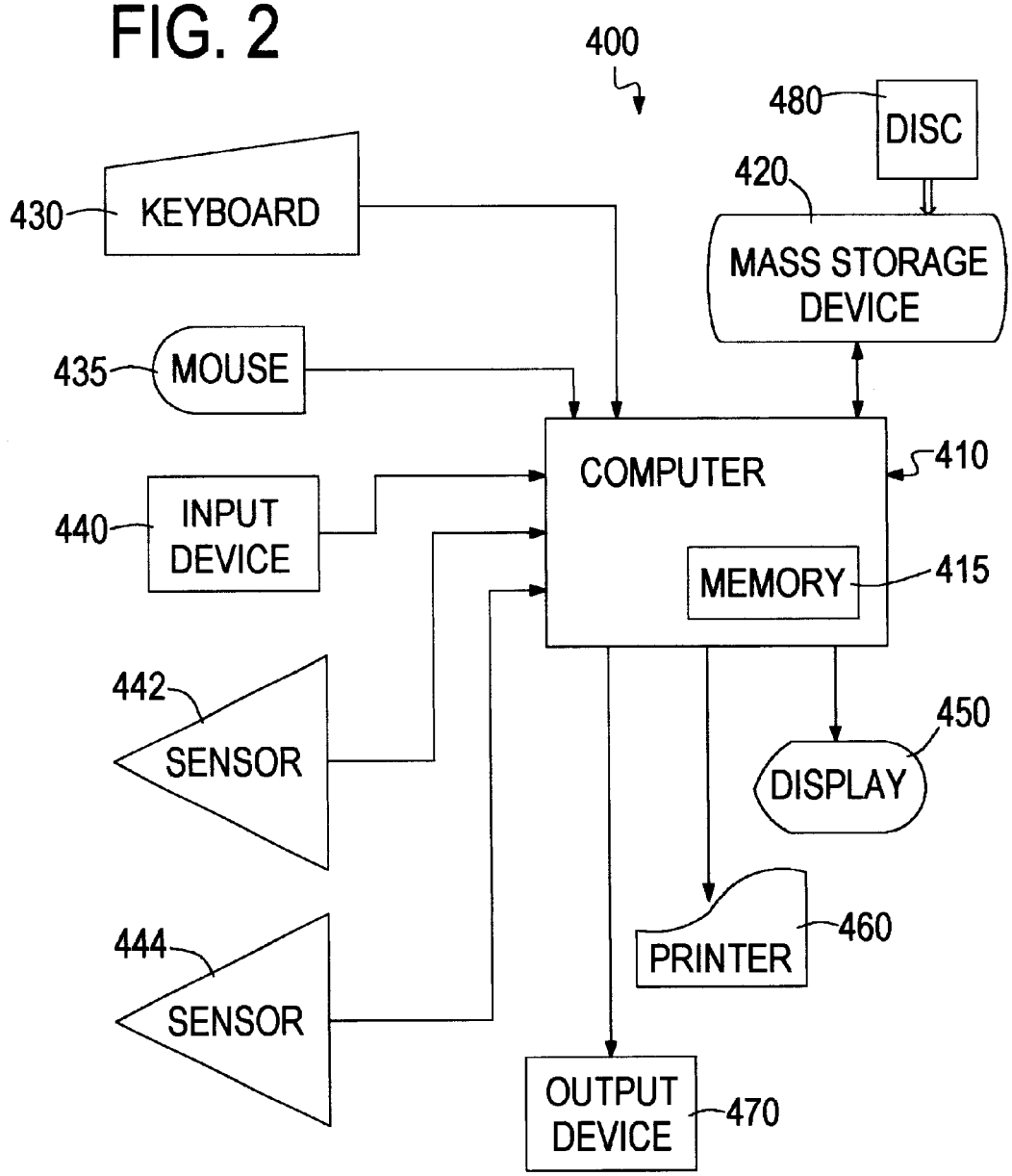

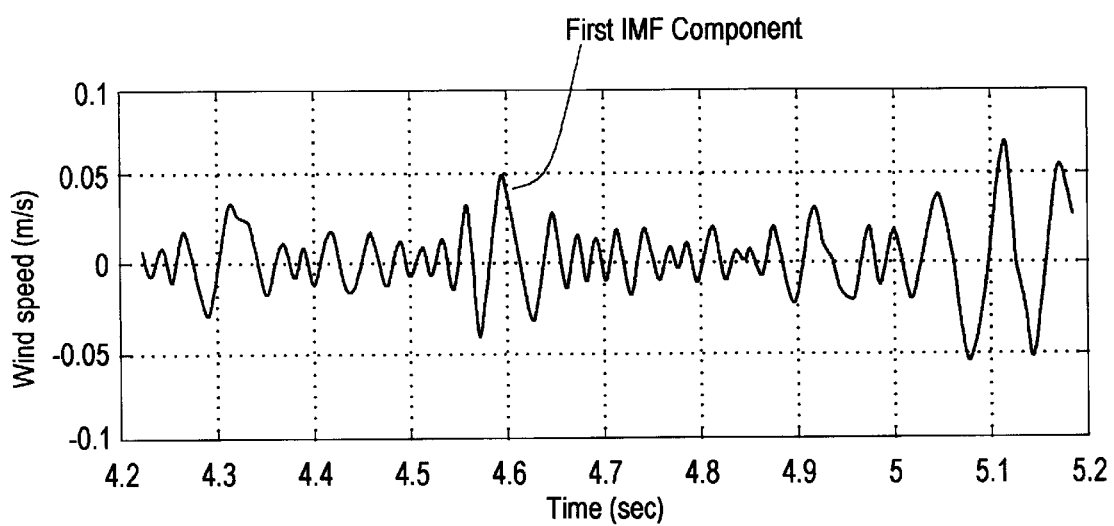

EMD-IMF without intermittency option

FIG. 3(k) EMD-IMF without intermittency option
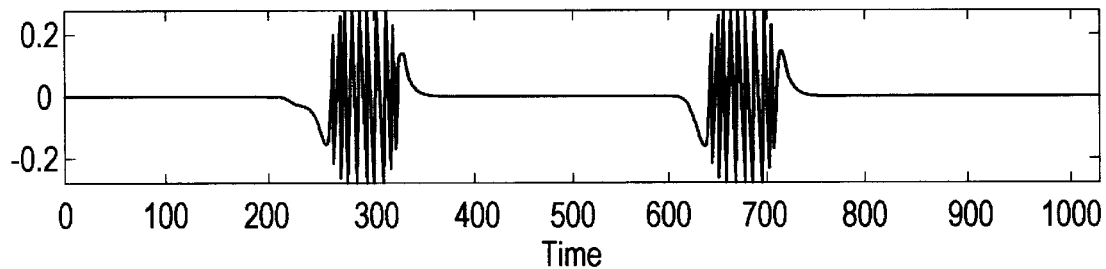
FIG. 3(l)
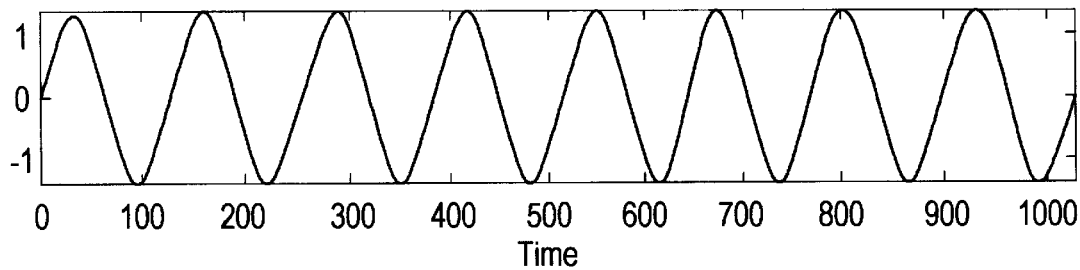
FIG. 3(m)
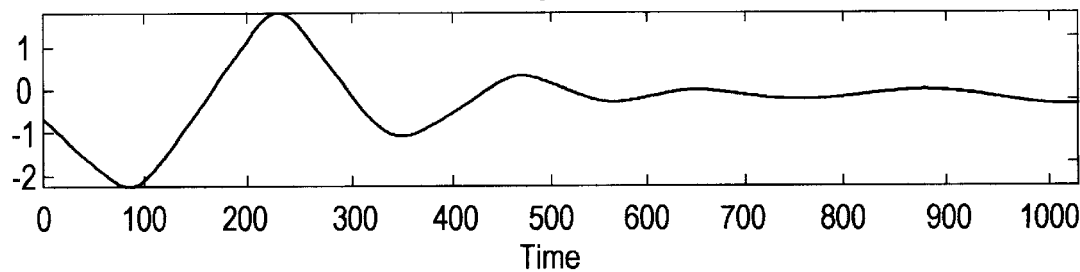

Curvature-sifting results on x

Local Extrema-sift results on the Lab. Propellor Axial Velocity

Curvature-sift results on the Lab. Propellor axial velocity
with intermittency test Mode-4 decomposed with curvature-sift algorithm Mode-4 decomposed with curvature-sift algorithm Wavelet Spectrum for Laboratory Wind Data

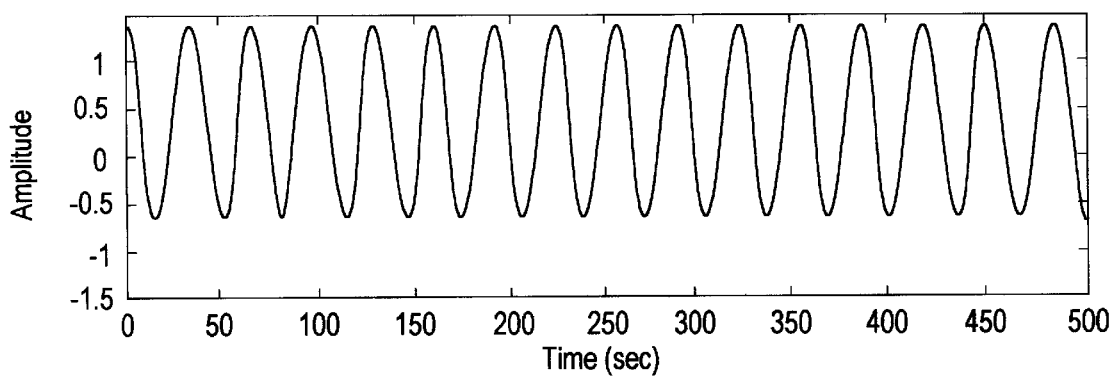
FIG. 18(a) 2nd Order Stokes Wave
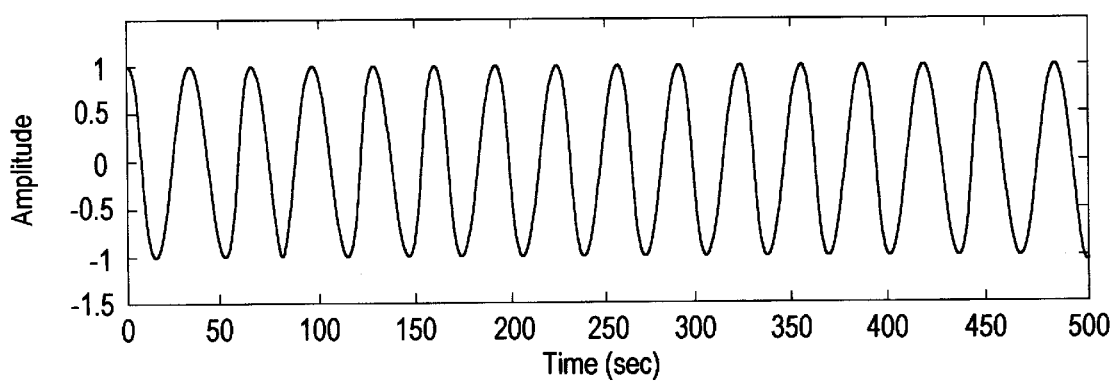
FIG. 18(b) IMF

COMPUTER IMPLEMENTED EMPIRICAL MODE DECOMPOSITION METHOD APPARATUS, AND ARTICLE OF MANUFACTURE UTILIZING CURVATURE EXTREMA

CROSS REFERENCES TO RELATED APPLICATIONS

This application claims the benefit of priority under 35 U.S.C. §120 to parent application Ser. No. (08/872,586) filed on Jun. 10, 1997, U.S. Pat. No. 5,983,162, which itself claims priority under 35 U.S.C. §119(e) to U.S. Provisional application Ser. No. 60/023,411 filed on Aug. 14, 1996 and Ser. No. 60/023,822 filed on Aug. 12, 1996.

ORIGIN OF INVENTION

One of the inventors of the invention described herein is an employee of the United States Government. Therefore, the invention may be manufactured and used by or for the Government for governmental purposes without the payment of any royalties thereon or therefor.

COLOR DRAWING NOTIFICATION

The file of this patent contains at least one drawing executed in color. Copies of this patent with color drawing (s) will be provided by the Patent and Trademark Office upon request and payment of the necessary fee.

COPYRIGHT NOTIFICATION

Portions of this patent application contain materials that are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Technical Field of the Invention

This invention generally relates to a computer implemented physical signal analysis method and apparatus. More particularly, this invention relates to a computer implemented method and apparatus for analyzing nonlinear, nonstationary physical signals.

2. Description of Related Art

Analyzing physical signals is a difficult problem confronting many industries. These industries have harnessed various computer implemented methods to process data taken from physical phenomena such as earthquakes, ocean waves, tsunamis, ocean surface elevation and wind. Unfortunately, previous methods have not yielded results which are physically meaningful.

Among the difficulties is that representing physical processes with physical signals may present one or more of the following problems:

(a) The total data span is too short;

(b) The data are nonstationary; and (c) The data represent nonlinear processes.

Although problems (a)–(c) are separate issues, the first two problems are related because a data section shorter than the longest time scale of a stationary process can appear to be nonstationary. Because many physical events are transient, the data representative of those events are nonstationary. For example, a transient event such as an earthquake will produce nonstationary data when measured. Nevertheless, the nonstationary character of such data is ignored or the effects assumed to be negligible. This assumption may lead to inaccurate results and incorrect interpretation of the underlying physics as explained below.

A variety of techniques have been applied to nonlinear, nonstationary physical signals. For example, many computer implemented methods apply Fourier spectral analysis to examine the energy-frequency distribution of such signals.

Although the Fourier transform that is applied by these computer implemented methods is valid under extremely general conditions, there are some crucial restrictions: the system must be linear, and the data must be strictly periodic or stationary. If these conditions are not met, then the resulting spectrum will not make sense physically.

A common technique for meeting the linearity condition is to approximate the physical phenomena with at least one linear system. Although linear approximation is an adequate solution for some applications, many physical phenomena are highly nonlinear and do not admit a reasonably accurate linear approximation.

Furthermore, imperfect probes/sensors and numerical schemes may contaminate data representative of the phenomenon. For example, the interactions of imperfect probes with a perfect linear system can make the final data nonlinear.

Many recorded physical signals are of finite duration, nonstationary, and nonlinear because they are derived from physical processes that are nonlinear either intrinsically or through interactions with imperfect probes or numerical schemes. Under these conditions, computer implemented methods which apply Fourier spectral analysis are of limited use. For lack of alternatives, however, such methods still apply Fourier spectral analysis to process such data.

In summary, the indiscriminate use of Fourier spectral analysis in these methods and the adoption of the stationary and linear assumptions may give misleading results some of which are described below.

First, the Fourier spectrum defines uniform harmonic components globally. Therefore, the Fourier spectrum needs many additional harmonic components to simulate nonstationary data that are nonuniform globally. As a result, energy is spread over a wide frequency range.

For example, using a delta function to represent the flash of light from a lightning bolt will give a phase-locked wide white Fourier spectrum. Here, many Fourier components are added to simulate the nonstationary nature of the data in the time domain, but their existence diverts energy to a much wider frequency domain. Constrained by the conservation of energy principle, these spurious harmonics and the wide frequency spectrum cannot faithfully represent the true energy density of the lighting in the frequency and time space.

More seriously, the Fourier representation also requires the existence of negative light intensity so that the components can cancel out one another to give the final delta function representative the lightning. Thus, the Fourier components might make mathematical sense, but they often do not make physical sense when applied.

Although no physical process can be represented exactly by a delta function, some physical data such as the near field strong earthquake energy signals are of extremely short duration. Such earthquake energy signals almost approach a delta function, and they always give artificially wide Fourier spectra.

Second, Fourier spectral analysis uses a linear uperposition of trigonometric functions to represent the data.

Therefore, additional harmonic components are required to simulate deformed wave profiles. Such deformations, as will be shown later, are the direct consequence of nonlinear effects. Whenever the form of the data deviates from a pure sine or cosine function, the Fourier spectrum will contain harmonics.

Furthermore, both nonstationarity and nonlinearity can induce spurious harmonic components that cause unwanted energy spreading and artificial frequency smearing in the Fourier spectrum. The consequence is incorrect interpretation of physical phenomenon due to the misleading energy-frequency distribution for nonlinear and nonstationary data representing the physical phenomenon.

According to the above background, the state of the art does not provide a useful computer implemented tool for analyzing nonlinear, nonstationary physical signals. Geophysical signals provide a good example of a class of signals in which this invention is applicable. Parent application Ser. No. 08/872,582 filed Jun. 10, 1997 illustrates several types of nonlinear, nonstationary geophysical-signals which are very difficult to analyze with traditional computer implemented techniques including earthquake signals, water wave signals, tsunami signals, ocean altitude and ocean circulation signals. The inventions presented herein and the parent application are particularly well-suited to processing such geophysical signals with a computer.

SUMMARY OF THE INVENTION

The invention employs a computer implemented Empirical Mode Decomposition method which decomposes physical signals representative of a physical phenomenon into components. These components are designated as Intrinsic Mode Functions (IMFs) and are indicative of intrinsic oscillatory modes in the physical phenomenon.

Contrary to almost all the previous methods, this new computer implemented method is intuitive, direct, a posteriori, and adaptive, with the basis of the decomposition based on and derived from the physical signal. The bases so derived have no close analytic expressions, and they can only be numerically approximated in a specially programmed computer by utilizing the inventive methods disclosed herein.

More specifically, the general method of the invention includes two main components or steps to analyze the physical signal without suffering the problems associated with computer implemented Fourier analysis, namely inaccurate interpretation of the underlying physics caused in part by energy spreading and frequency smearing in the Fourier spectrum.

The first step is to process the data with the Empirical Mode Decomposition (EMD) method, with which the data are decomposed into a number of Intrinsic Mode Function (IMF) components. In this way, the signal will be expanded by using a basis that is adaptively derived from the signal itself.

The second step of the general method of the present invention is to apply the Hilbert Transform to the decomposed IMF's and construct an energy-frequency-time distribution, designated as the Hilbert Spectrum, from which occurrence of physical events at corresponding times (time localities) will be preserved. There is also no close analytic form for the Hilbert Spectrum. As explained below, the invention avoids this problem by storing numerical approximations in the specially programmed computer by utilizing the inventive method.

The invention also utilizes instantaneous frequency and energy to analyze the physical phenomenon rather than the global frequency and energy utilized by computer implemented Fourier spectral analysis.

Furthermore, a computer implementing the invention, e.g., via executing a program in software, to decompose physical signals into intrinsic mode functions with EMD and generate a Hilbert spectrum is also disclosed. Because of the lack of close form analytic expression of either the basis functions and the final Hilbert spectrum; computer implementation of the inventive methods is an important part of the overall method.

Still further, the invention may take the form of an article of manufacture. More specifically, the article of manufacture is a computer-usable medium, including a computer-readable program code embodied therein wherein the computer-readable code causes a computer to execute the inventive method.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Furthermore, all the mathematic expressions are used as a short hand to express the inventive ideas clearly and are not limitative of the claimed invention.

BRIEF DESCRIPTION OF DRAWINGS

The file of this patent contains at least one drawing executed in color. Copies of this patent with color drawings will be provided by the Patent and Trademark Office upon request and payment of the necessary fee.

The present invention will become more fully understood from the detailed description given hereinbelow and the accompanying drawings which are given by way of illustration only, and thus are not limitative of the present invention, and wherein:

FIG. 1(a) is a high-level flowchart describing the overall inventive method which may be implemented on the computer system shown in FIG. 2;

FIG. 2 is a high-level block diagram of a computer system which may be programmed with the inventive methods with the result being a special purpose computer;

FIG. 3(f) is a graph of the first intrinsic mode function component which is generated by the local extrema Sifting Process of the invention;

FIGS. 3(g)–(j) are graphs of the first, second, and third intrinsic mode functions when the local extrema Sifting Process is applied to the data of FIG. 3(g) without applying the intermittency test option;

FIGS. 3(k)–(m) are graphs of the first, second, and third intrinsic mode functions when the local extrema Sifting Process is applied to data of. FIG. 3(g) which applies the intermittency test option;

FIG. 18(a) shows the profile of a Stokes wave in deep water which may be processed by the invention;

FIG. 18(b) shows the IMF generated by the invention from the Stokes wave shown in FIG. 9(a);

DETAILED DESCRIPTION OF PREFERRED EMBODIMENTS

Figure 1B:
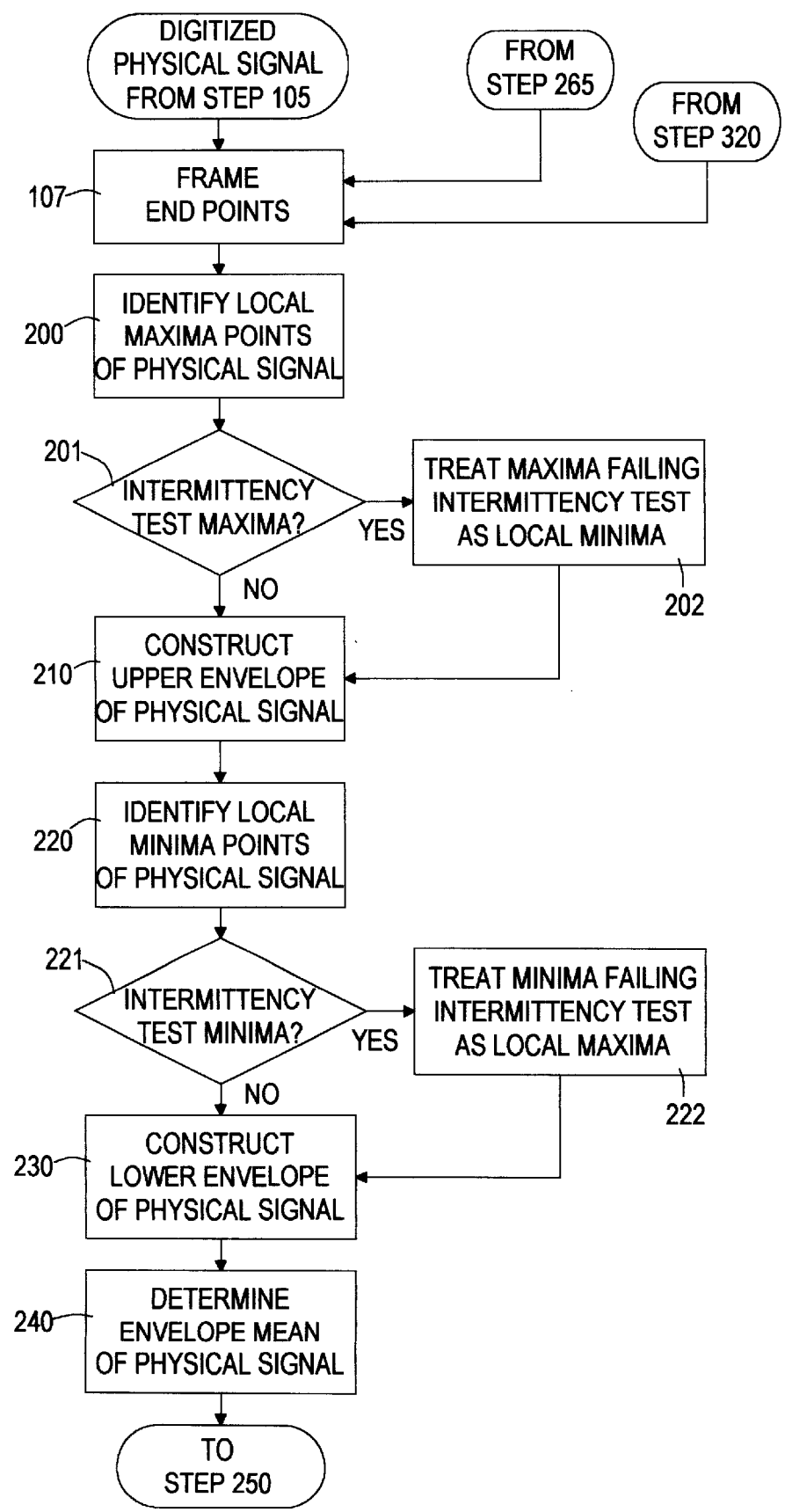
FIG. 1(b) is a high-level flowchart describing the local extrema Sifting Process which may be implemented on the computer system shown in FIG. 2.

Before describing the computer implemented Empirical Mode Decomposition method in detail, the definition and physical meaning of intrinsic mode functions will be discussed.

Intrinsic Mode Function

An Intrinsic Mode Function (IMF) is a function that satisfies the following two conditions:
 (a) in the whole data set, the number of extrema and the number of zero-crossings must either be equal or differ at most by one, and
 (b) at any point, the mean value of upper envelope defined by the maxima and the lower envelope defined by the minima is zero.

The first condition shares some similarity to the traditional narrow band requirements for a stationary Gaussian process. The second condition is a totally new idea. Conceptually, the second condition modifies the classical global requirement to a local one. Furthermore, the second condition has the desirable result that the instantaneous frequency will not have unwanted fluctuations induced by asymmetric wave forms. Mathematically, the second condition should ideally be 'the local mean of the data being zero.' For nonstationary data, the 'local mean' requires a 'local time scale' to compute the mean, which is impossible to define. Fortunately, the local time scale need not be defined to fulfil the second condition, as will be discussed below.

To apply these concepts to physical data, the invention utilizes the local mean of the signal envelopes to force the local symmetry.

In the local extrema Sifting Process, the signal envelopes are defined by the local maxima and the local minima. This is an approximation which avoids the definition of a local averaging time scale. With the physical approach and the approximation adopted here, the inventive method does not always guarantee a perfect instantaneous frequency under all conditions. Nevertheless, it can be shown that, even under the worst conditions, the instantaneous frequency so defined is still consistent with the physics of the system being studied and represents the system being studied much more accurately than previous techniques based on Fourier analysis.

The term "Intrinsic Mode Function (IMF)" is adopted because it represents the oscillation mode embedded in the data. With this definition, the IMF in each cycle, defined by the zero-crossings, involves only one mode of oscillation. In other words, each IMF represents only one group of oscillation modes or time scales and no riding waves are allowed.

Before presenting the inventive EMD method for decomposing the data into IMFs, a qualitative assessment of the intrinsic oscillatory modes may be roughly determined by simply examining the data by eye. From this examination, one can immediately identify the different scales directly in two ways: the time lapse between the successive alternations of local maxima and minima and the time lapse between the successive zero-crossings reveals the different scales. The interlaced local extrema and zero-crossings give us complicated data: one undulation is riding on top of another, and they, in turn, are riding on still other undulations, and so on. Each of these undulations defines a characteristic scale or oscillation mode that is intrinsic to the data: hence, the term "Intrinsic Mode Function" is adopted.

To reduce the data into the needed IMFs, the invention utilizes a computer implemented Empirical Mode Decomposition Method which is described below.

Empirical Mode Decomposition (EMD): The Sifting Process

First, the Empirical Mode Decomposition method which deals with both nonstationary and nonlinear data will be discussed. Then, the physical meaning of this decomposition will be presented.

The essence of the EMD method is to identify empirically the intrinsic oscillatory modes by their characteristic time scales in the data, and then decompose the data accordingly. The decomposition is based on the following assumptions:

a. the signal has at least two extrema: one maximum and one minimum, and b. the characteristic time scale is defined by the time lapse between the extrema.

In other words, the invention adopts the time lapse between successive extrema as the definition of the time scale for the intrinsic oscillatory mode because it gives a much finer resolution of the oscillatory modes and because it can be applied to data with non-zero mean (either all positive or all negative values, without zero-crossings). A systematic way to extract the intrinsic mode functions is the computer implemented Empirical Mode Decomposition method or Sifting Process which is described as follows.

FIG. 1(a) illustrates the overall inventive method including the Sifting Process in step 120. As explained below, the Sifting Process of step 120 may either be the local extrema Sifting Process of FIGS. 1(b) and 1(c) or the curvature extrema Sifting Process illustrated in FIGS. 1(d)–(e).

First, as illustrated in FIG. 1(a), the physical activity, process or phenomenon is sensed by an appropriate sensor in step 100.

After sensing in step 100, the analog signal is converted to the digital domain suitable for computer processing in the A/D conversion step 105.

Next, an optional smoothing step 110 may be applied to the physical signal. The optional smoothing step 110 may be applied to smooth the signal with, for example, a weighted running average to remove excessive noise.

Thereafter, the Sifting Process (either the local extrema or curvature extrema Sifting Processes) is applied in step 120 to sift the signal with the Empirical Mode Decomposition method and thereby extract the intrinsic mode function(s). The intrinsic mode functions can then be displayed as shown in step 130 and checked for orthogonality in step 135.

Before continuing with the main flow in FIG. 1(a), the details of the local extrema Sifting Process will be explained with reference to the high level flowchart in FIGS. 1(b), 2(c) and the series of graphs showing illustrative results of the local extrema Sifting Process in FIGS. 3(a)–(f).

Figure 3A:
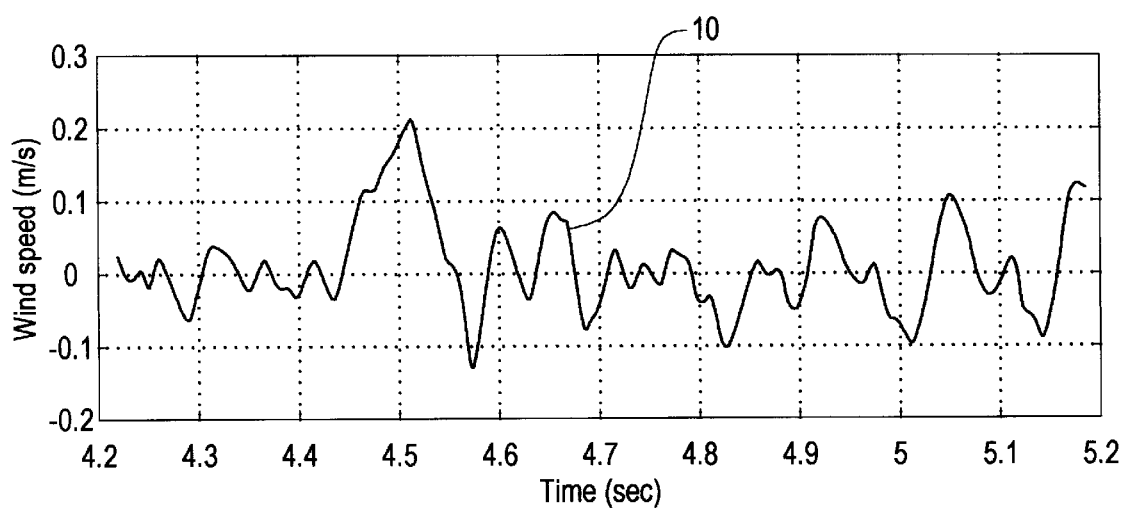
FIG. 3(a) shows wind speed data in the form of a graph plotting wind speed as a function of time for explaining the computer implemented Empirical Mode Decomposition method of the invention using local extrema.

As shown in FIG. 1(b), the digitized physical signal from step 105 is first windowed by framing the end points in step 107. Then, the local extrema Sifting Process begins at step 200 by identifying local maximum values of the digitized, framed physical signal from step 107. FIG. 3(a) shows a typical physical signal 10 which, in this example, represents wind speed spanning a time interval of one second.

Before construction of the envelope in steps 210 and 230, optional intermittency tests (201,221) may be introduced to alleviate the alias associated with intermittence in the data that can cause mode mixing.

Optional intermittency test 201 checks the distance between successive maxima to see if this distance between is within a pre-assigned value n times the shortest distance between waves. If no, then an intermittency exists and the method proceeds to step 202. If yes, then there is no intermittency and the upper envelope is constructed in step 210 as further described below.

Similarly optional intermittency test 221 checks the distance between successive minima to see if this distance is within a pre-assigned value n times the shortest distance between waves. If no, then an intermittency exists and the method proceeds to step 222. If yes, then there is no intermittency and the upper envelope is constructed in step 230 as further described below.

Figure 3B:
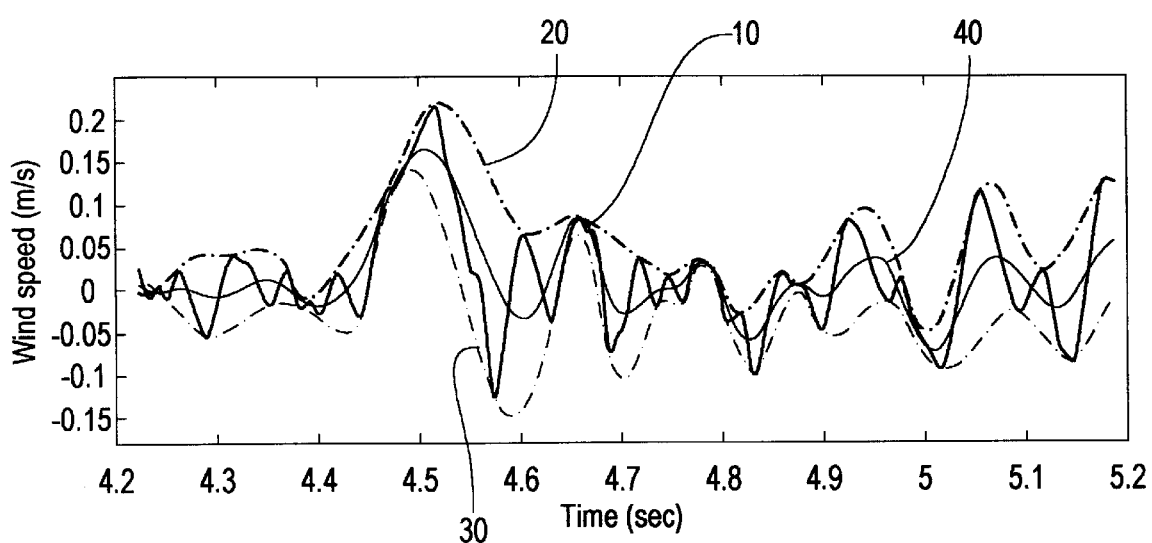
FIG. 3(b) is a graph illustrating the upper envelope, lower envelope, envelope mean and original wind speed data which are utilized to explain the computer implemented Empirical Mode Decomposition method of the invention using local extrema.
Figure 3C:
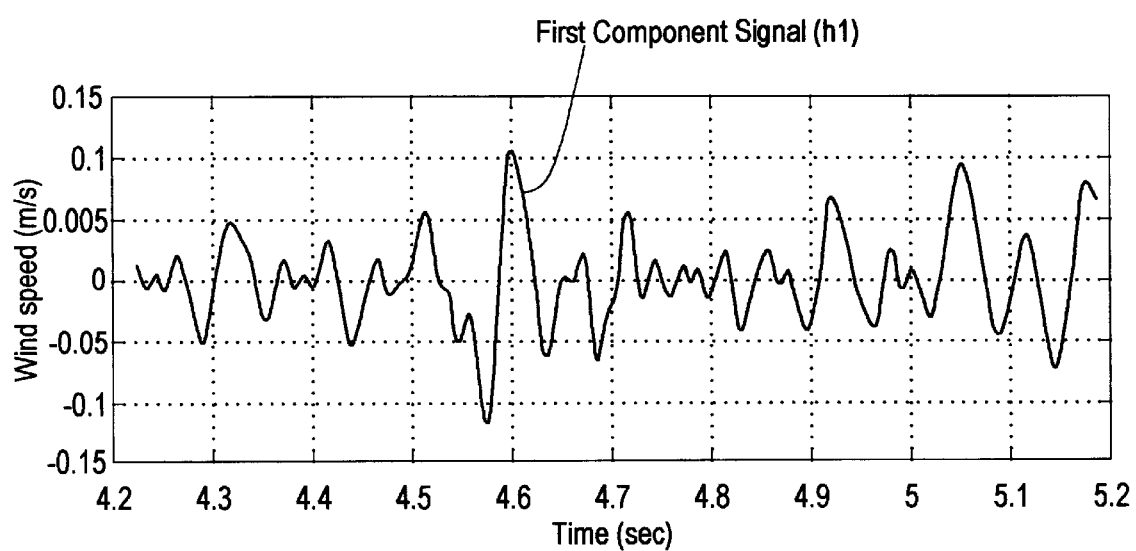
FIGS. 3(c)–(e) are graphs of the first, second and third component signals h1, h11, h21, respectively which are generated by the local extrema Sifting Process of the invention.
Figure 3D:
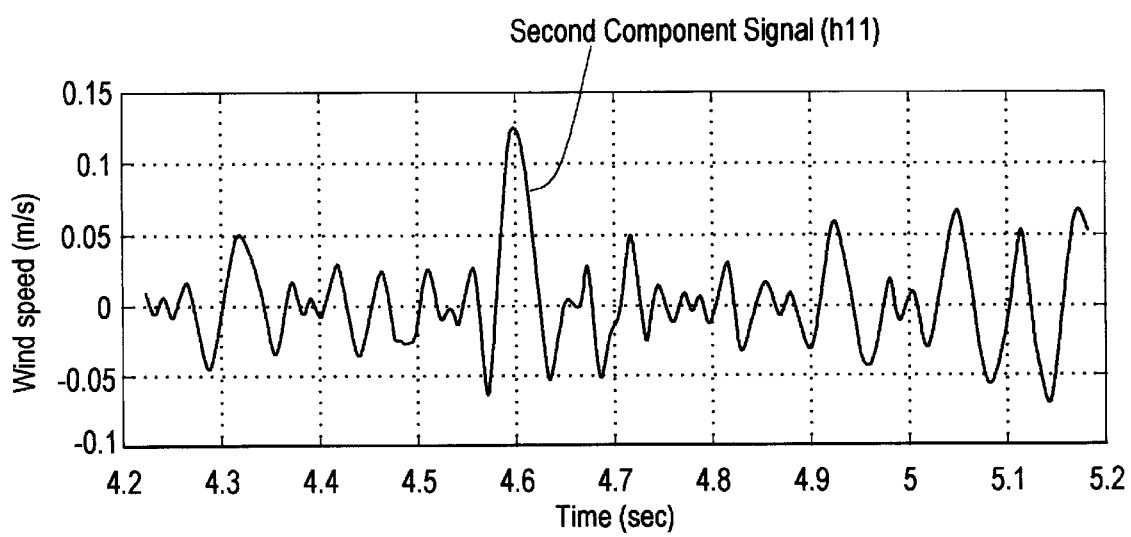
Figure 3E:
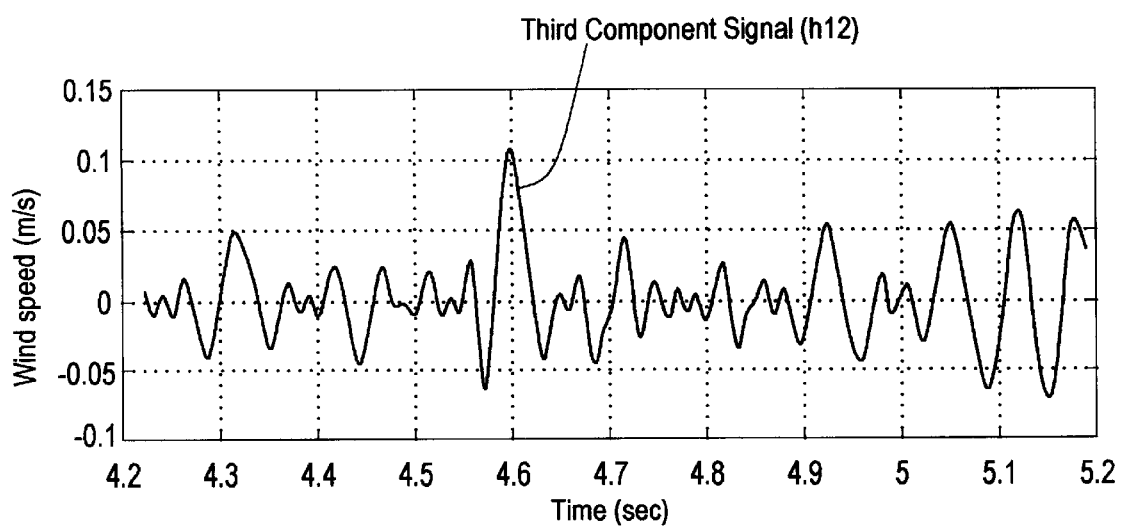
Figure 3G:
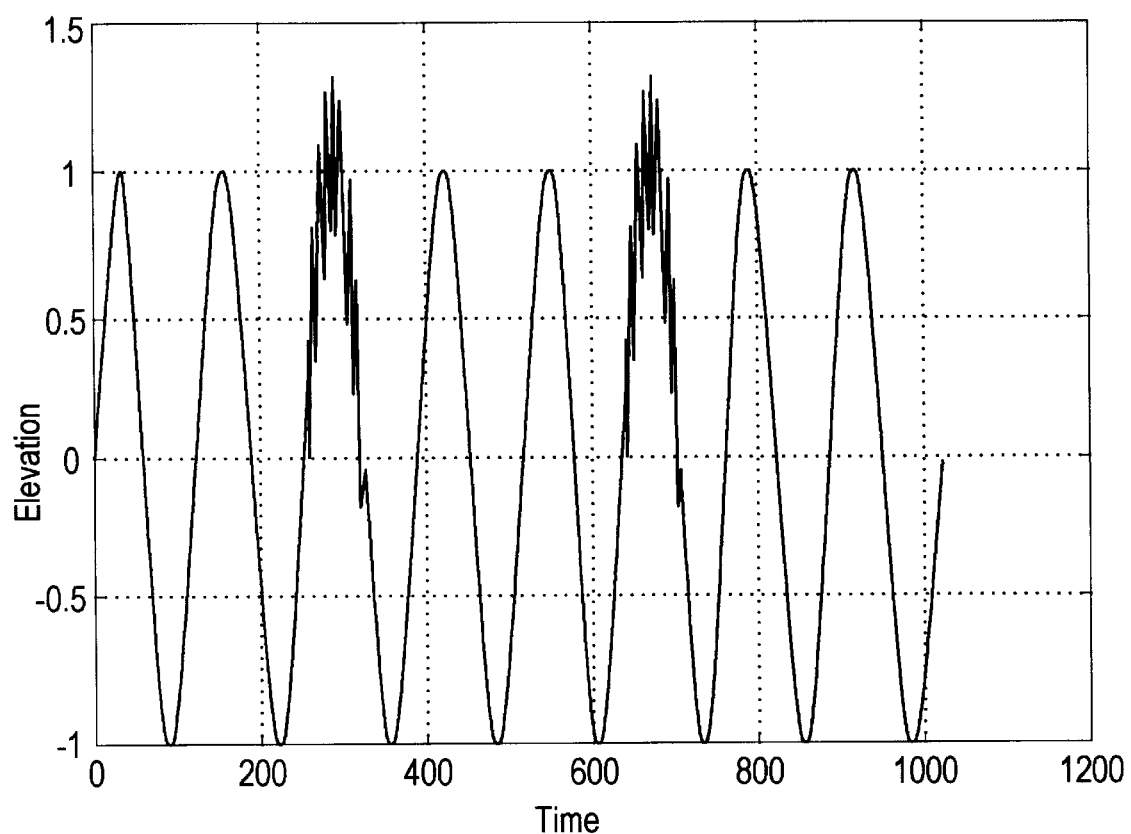
FIG. 3(g) is a graph of data with intermittency for illustrating an optional intermittency test of the invention.
Figure 3H:
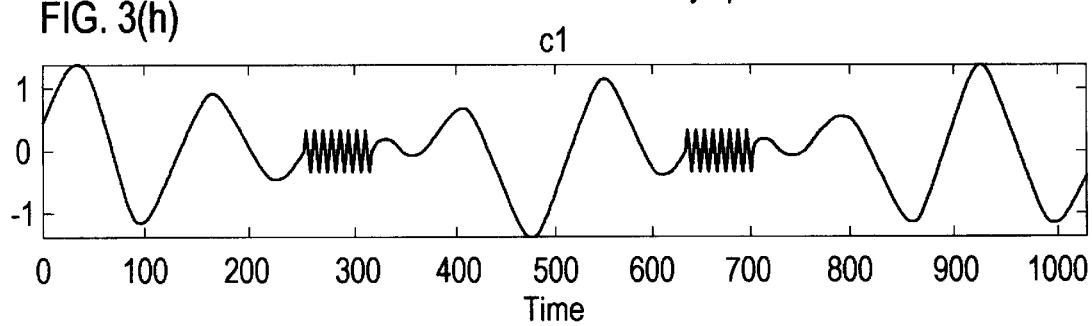
Figure 3I:
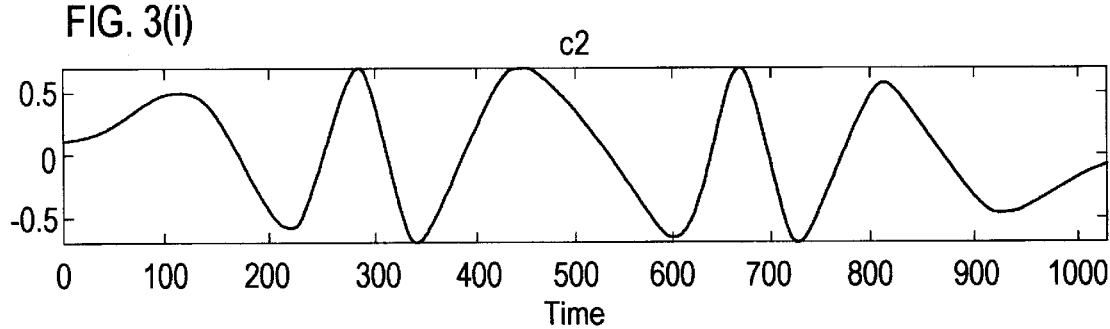
Figure 3J:
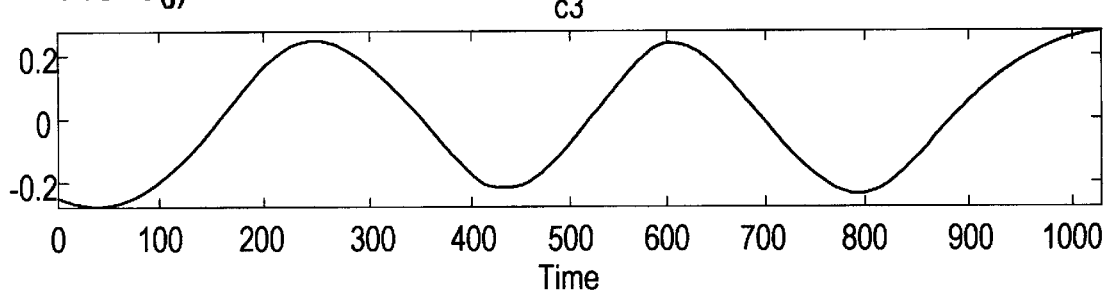
Figure 4A:
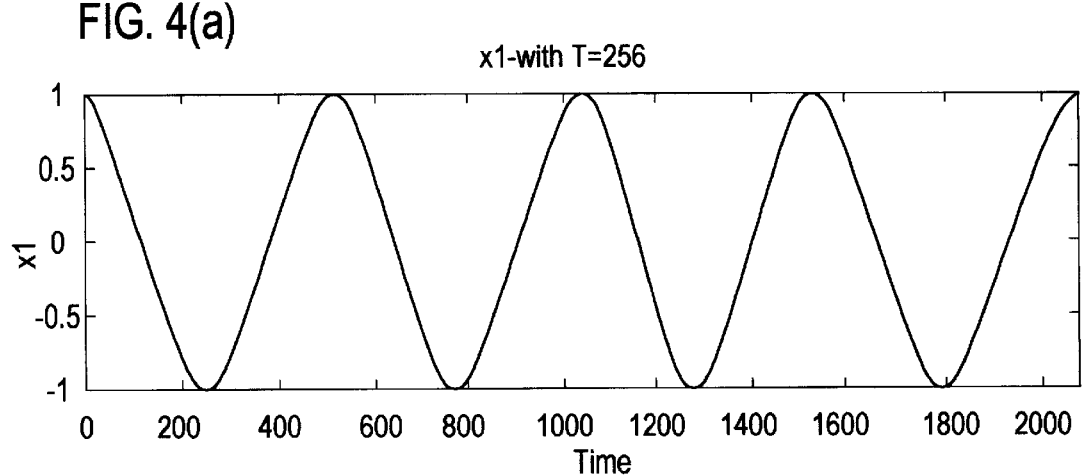
FIG. 4(a) is a graph of a first signal X1 which is for explaining the computer implemented Empirical Mode Decomposition method of the invention using curvature extrema.
Figure 4B:
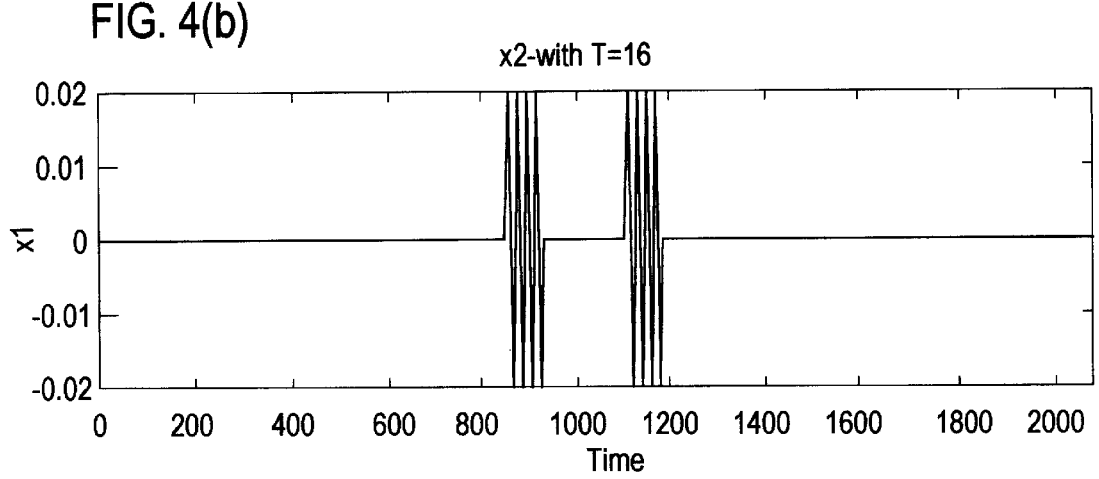
FIG. 4(b) is a graph of a second signal X2 which is for explaining the computer implemented Empirical Mode Decomposition method of the invention using curvature extrema.
Figure 4C:
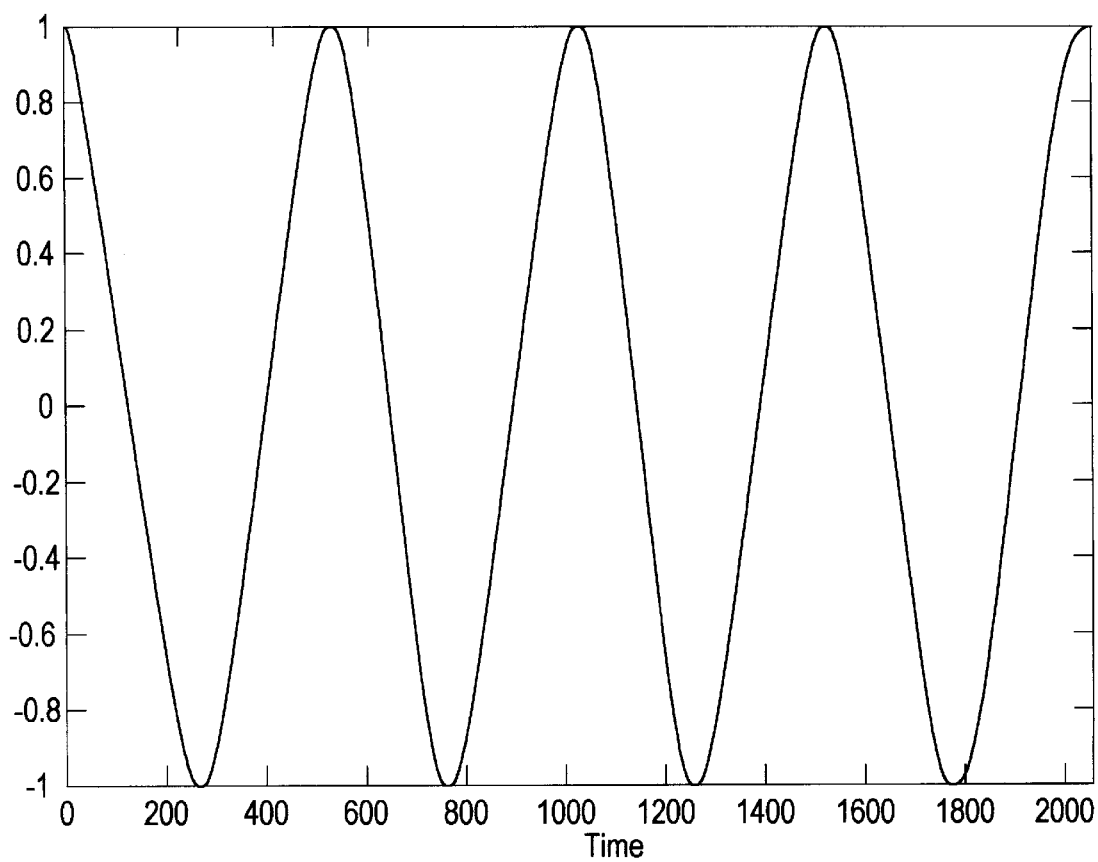
FIG. 4(c) is a graph of a signal X (the summation of signals X1 and X2) which is for explaining the computer implemented Empirical Mode Decomposition method of the invention using curvature extrema.
Figure 4D:
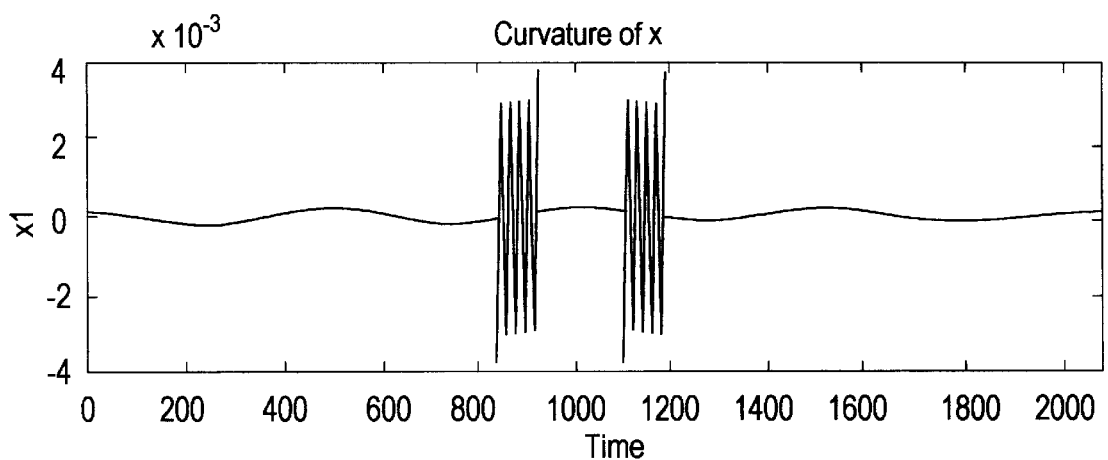
FIG. 4(d) is a graph of the curvature function derived from the signal X and illustrating extrema of the curvature function.
Figure 4E:
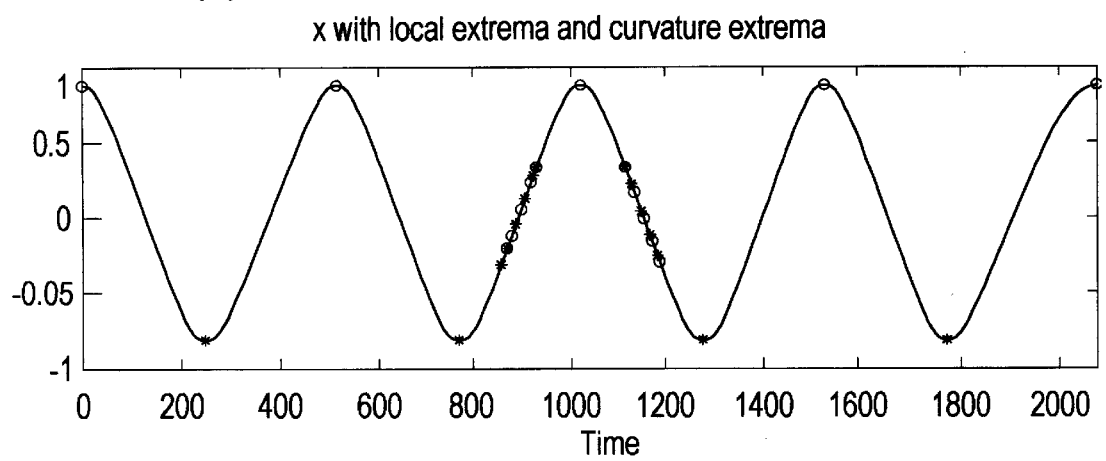
FIG. 4(e) is a graph of the signal X (the summation of signals X1 and X2) illustrating curvature extrema corresponding to the extrema of the curvature function and local extrema of the signal X.

An example of such intermittency is given in FIG. 3(g), in which small scale waves appear only intermittently. By strict application of the local extrema Sifting Process, the resulting IMFs are given in FIGS. 3(b)–(j), in which two drastically different time scales are present in the first IMF component as shown in FIG. 3(g). This mixing of modes breaks up the main wave train by the small intermittent oscillations.

If intermittency tests (201,222) are employed which utilize a preassigned value of n-times the shortest distance between waves, the resulting IMFs are shown in FIGS. 3(k)–(m), in which the modes are clearly and physically separated. The effective step to eliminate the mode mixing is achieved by treating the local extrema which failed the intermittency test as local maxima and minima (steps 202 and 212), respectively. Therefore, the upper and lower envelope will be identical as the original data reference line.

These intermittency tests (201,221) and the further steps (202,222) are optional. By selecting an artificially large n value utilized in steps 201 and 221 to test for intermittency, the test will be effectively passed. Otherwise, the test can be bypassed at the initial selection of the program.

Then, the method constructs an upper envelope 20 of the physical signal 10 in step 210. The upper envelope 20 is shown in FIG. 3(b) using a dot-dashed line. This upper envelope 20 is preferably constructed with a cubic spline that is fitted to the local maxima.

Next, the local minimum values of the physical signal 10 are identified in step 220. To complete the envelope, a lower envelope 30 is constructed from the local minimum values in step 230. The lower envelope is also shown in FIG. 3(b) using a dot-dash line. Like the upper envelope 20, the lower envelope 30 is preferably constructed with a cubic spline that is fitted to the local minima.

The upper and lower envelopes 20, 30 should encompass all the data within the physical signal 10. From the upper and lower envelopes 20, 30, an envelope mean 40 is the determined in step 240. The envelope mean 40 is the mean value of the upper and lower envelopes 20, 30. As can be seen in FIG. 3(b), the envelope mean 40 bisects the physical signal 10 quite well.

Then, the method generates the first component signal $h_1$ in step 250 by subtracting the envelope mean 40 from the physical signal 10. This computer implemented step may also be expressed as:

$$X(t) - m_1 = h_1. \qquad (1)$$

Where the envelope mean 40 is $m_1$ and the physical signal is $X(t)$.

FIG. 3(c) shows the first component signal $h_1$. Ideally, the first component signal $h_1$ should be an IMF, for the construction of $h_1$ described above seems to have made $h_1$ satisfy all the requirements of an IMF. In reality, however, a gentle hump that resides on a slope region of the data can become an extremum when the reference coordinate is changed from the original rectangular coordinate to a curvilinear coordinate. For example, the imperfection of the envelopes 20, 30 can be seen by observing the overshoots and undershoots at the 4.6 and 4.7 second points in FIG. 3(b).

An example of this amplification can be found in the gentle hump between the 4.5 and 4.6 second range in the data in FIG. 3(a). After the first round of sifting, the gentle hump becomes a local maximum at the same time location in the first component signal $h_1$ shown in FIG. 3(c). New extrema generated in this way actually recover the proper modes lost in the initial examination. Thus, the local extrema Sifting Process extracts important information from the signal which may be overlooked by traditional techniques. In fact, the Sifting Process can recover low amplitude riding waves, which may appear as gentle humps in the original signal, with repeated siftings.

Still another complication is that the envelope mean 40 may be different from the true local mean for nonlinear data. Consequently, some asymmetric wave forms can still exist no matter how many times the data are sifted. This must be accepted because, after all, the inventive method is an approximation as discussed before.

Other than these theoretical difficulties, on the practical side, serious problems of the spline fitting can occur near the ends, where the cubic spline fitting can have large swings. Left by themselves, the end swings can eventually propagate inward and corrupt the whole data span especially in the low frequency components. A numerical method has been devised to eliminate the end effects details of which will be given later. Even with these problems, the Sifting Process can still extract the essential scales from the data.

The Sifting Process serves two purposes: to eliminate riding waves and to make the wave profiles more symmetric. Toward these ends, the Sifting Process has to be repeated. Because only the first component signal $h_1$ has been generated so far, the decision step 260, which tests successive component signals to see if they satisfy the definition of an IMF, is bypassed during the first iteration.

Thus, step 265 is performed which treats the component signal as the physical signal in the next iteration. The next iteration is then performed by executing steps 200–250. In step 250, the second component signal $h_{11}$ is generated by subtracting the envelope mean from the physical signal (in this iteration, the first component signal $h_1$ is treated as the physical signal). In more formal terms:

$$h_1 - m_{11} = h_{11}. \qquad (2)$$

FIG. 3(d) shows the second component signal $h_{11}$. Although the second sifting shows great improvement in the signal with respect to the first sifting, there is still a local maximum below the zero line. After a third sifting, the result (third component signal $h_{12}$) is shown in FIG. 3(d). Now all the local maxima are positive, and all the local minima are negative, but to ensure this configuration is stable, the local extrema Sifting Process should be further repeated. In general, the Sifting Process is repeated at least 3 more times and, in general, K times to produce $h_{1k}$. If no more new extrema are generated, then $h_{1k}$ is an IMF. In formal terms:

$$h_{1(k-1)} - m_{1k} = h_{1k}; \qquad (3)$$

The resulting first IMF component is shown in FIG. 3(f) after 9 siftings. The first IMF component of the physical signal may be designated as such in step 270 and stored in step 275 in memory 415:

$$c_1 = h_{1k}, \qquad (4)$$

As mentioned above, all these manipulations are carried out numerically in a computer 410. There is not explicit close form analytic expression for any of the computer implemented steps.

As described above, the process is indeed like sifting of the data by the computer 410 because it separates the finest (shortest time scale) local mode from the data first based only on the characteristic time scale. The Sifting Process, however, has two effects:

a. to eliminate riding waves, and b. to ensure the envelopes generated by maxima and minima are symmetric.

While the first condition is necessary for the instantaneous frequency to be meaningful (as discussed below), the second condition is also necessary in case the neighboring wave amplitudes have too large a disparity.

Unfortunately, the effects of the second condition, when carried to the extreme, could obliterate the physically meaningful amplitude fluctuations. Therefore, the Sifting Process should be applied with care, for carrying the process to an extreme could make the resulting IMF a pure frequency modulated signal of constant amplitude.

To guarantee that the IMF component retains enough physical sense of both amplitude and frequency modulations, a stopping criterion is employed to stop the generation of the next IMF component.

Figure 1C:
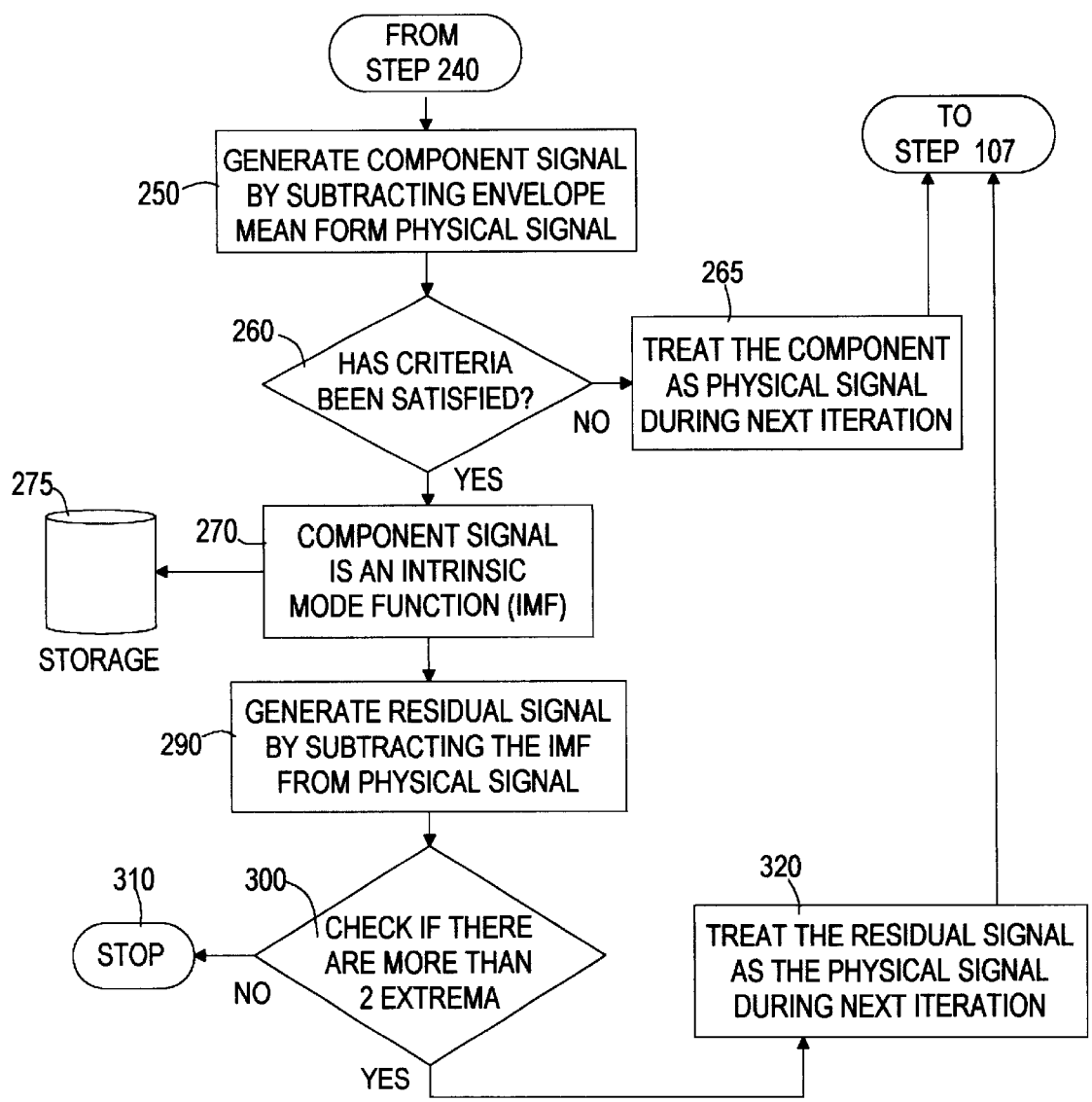
FIG. 1(c) is a continuation of the high-level flowchart in FIG. 1(b) describing the local extrema Sifting Process which may be implemented on the computer system shown in FIG. 2.
Figure 1D:
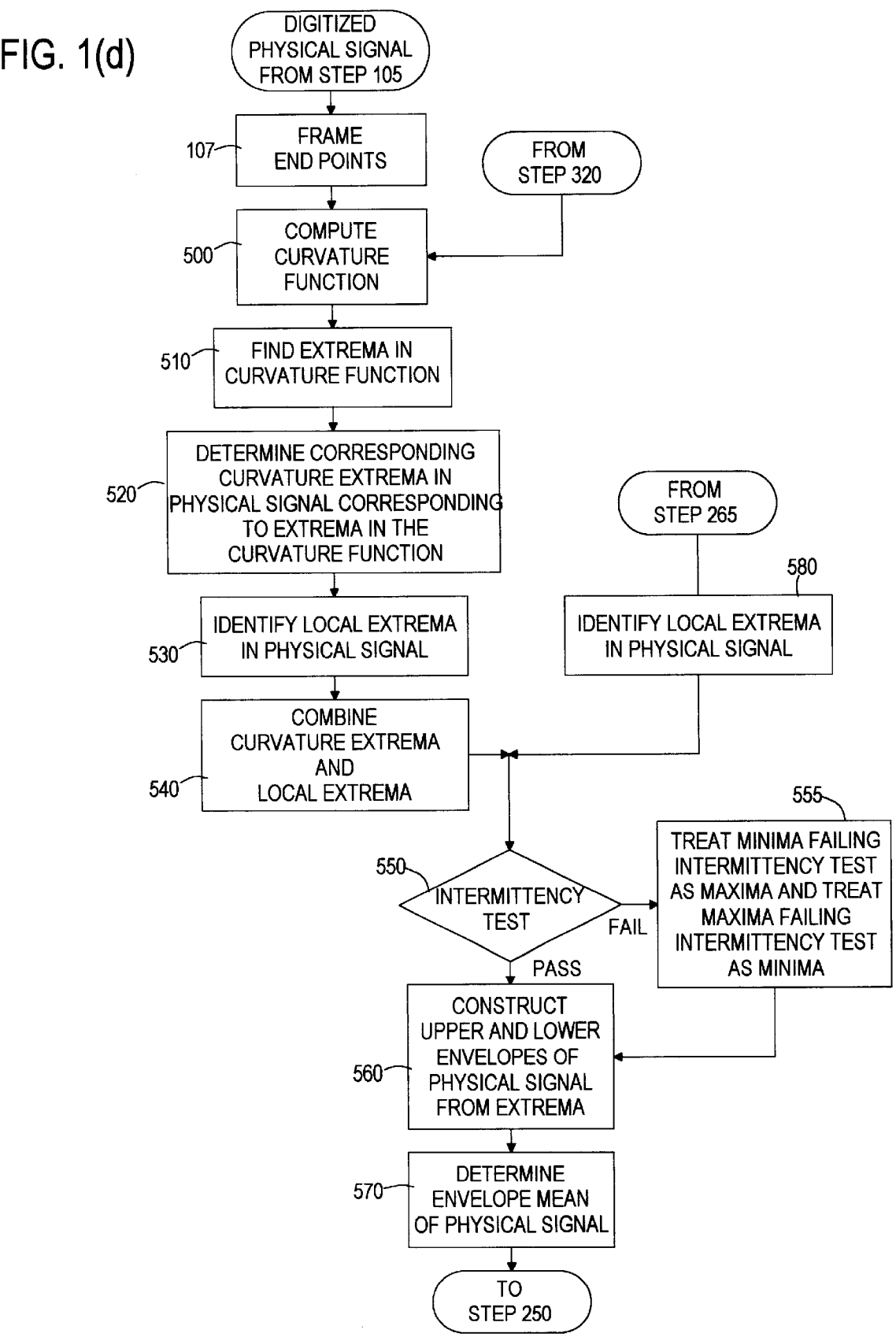
FIG. 1(d) is a high-level flowchart describing the curvature extrema Sifting Process which may be implemented on the computer system shown in FIG. 2.
Figure 1E:
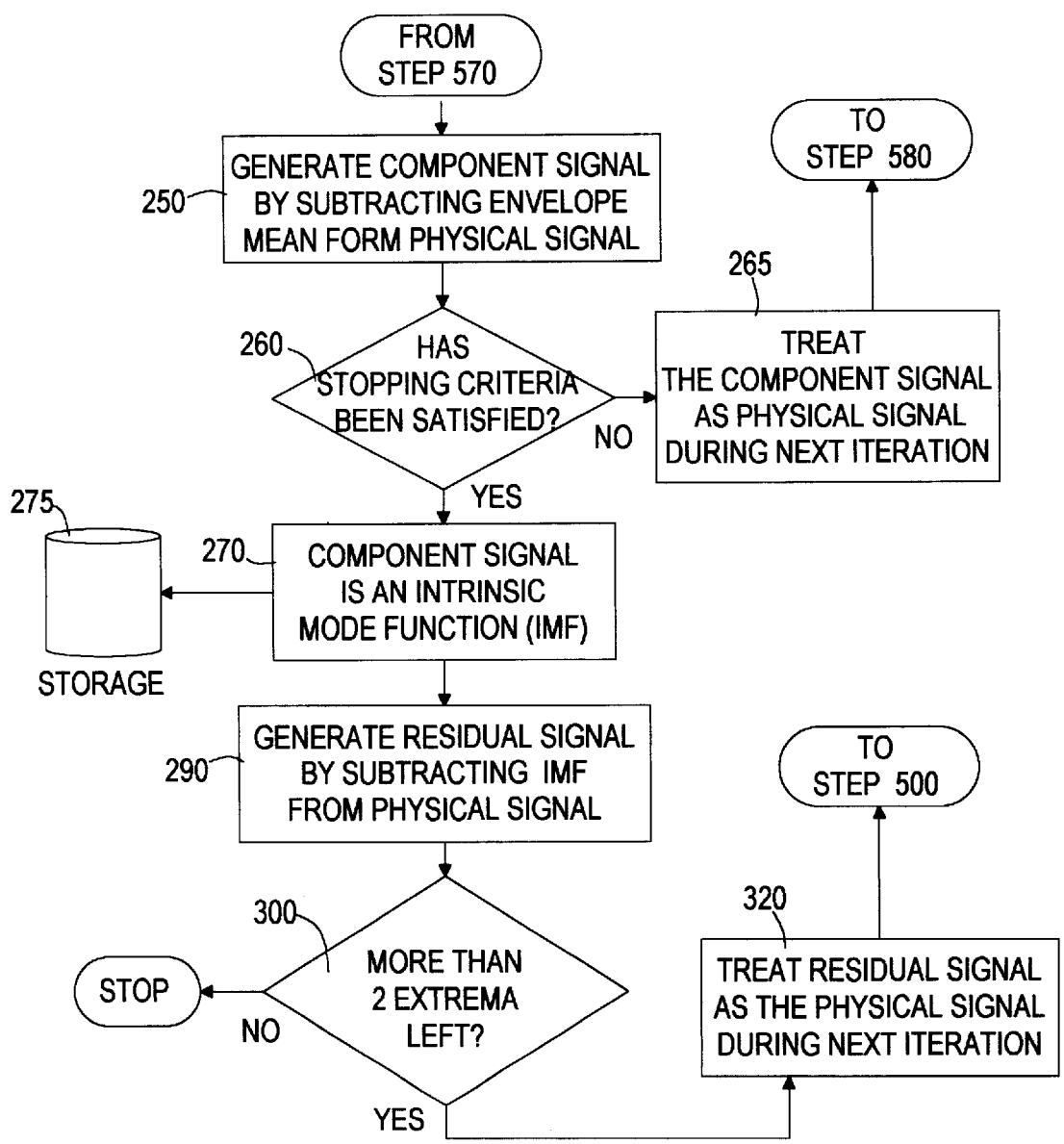
FIG. 1(e) is a continuation of the high-level flowchart in FIG. 1(d) describing the curvature extrema Sifting Process which may be implemented on the computer system shown in FIG. 2.

This stopping criterion is part of the computer implemented method and is shown as step 260 in FIG. 1(c). Step 260 is a decision step that decides whether the stopping criteria has been satisfied. The preferred stopping criteria determines whether three successive component signals satisfy the definition of IMF. If three successive component signals all satisfy the definition of IMF, then the Sifting Process has arrived at an IMF and should be stopped by proceeding to step 270. If not, step 260 starts another iteration by proceeding to step 265 as described above.

Alternatively, another stopping criteria could be used that determines whether successive component signals are substantially equal. If successive component signals are substantially equal, then the Sifting Process has arrived at an IMF and should be stopped by proceeding to step 270. If not, step 260 starts another iteration by proceeding to step 265 as described above.

Determining whether successive component signals are substantially equal in the alternative stopping criteria limits the size of the standard deviation, sd, computed from the two consecutive sifting results as follows:

$$sd = \sum_{t=0}^{T} \left[ \frac{|(h_{1(k-1)}(t) - h_{1k}(t))|^2}{h_{1(k-1)}^2(t)} \right]. \tag{5}$$

A very rigorous and preferred value for sd is set between 0.2 and 0.3. Of course, if faster processing is desired, then a trade-off such as a less rigorous value for sd may be used.

Overall, the first IMF component $c_1$ should contain the finest scale or the shortest period component of the physical signal 10.

Before extracting the next IMF component, a test should be conducted to determine if the local extrema Sifting Process should stop. The stopping criteria is shown in Step 300. Step 300 determines whether the component signal has more than 2 extrema. If not, all of the IMF's have been extracted and the local extrema Sifting Process is stopped by proceeding to step 310. If so, then additional IMF's may be extracted by continuing the process in step 320.

Step 270 recognizes that an IMF component has been successfully generated by the Sifting Process by setting the component signal equal to an intrinsic mode function. More specifically, step 270 causes the computer 410 to store the component signal hik as an intrinsic mode function in memory 415.

Then, the first IMF is separated from the physical signal in step 290 to generate a residual signal. In particular, a residual signal is generated by subtracting the intrinsic mode function from the physical signal. In formal terms:

$$X(t) - c_1 = r_1. \tag{6}$$

Because the residue, $r_1$, still includes information of longer period components, it is treated as the new physical data and subjected to the same Sifting Process as described above. Step 320 performs this function by treating the residual signal as the physical signal in the next iteration. Thereafter, the next iteration is performed beginning with the execution of step 200 as described above.

The Sifting Process is analogous to a mechanical sieve, except it is implemented here in specially programmed computer and applied to any digital data numerically rather than mechanically.

The Sifting Process is repeated for all the subsequent $r_j$'s. This iterative procedure may be expressed as:

$$r_1 - c_2 = r_2, \ldots, r_{n-1} - c_n = r_n. \tag{7}$$

Step 300 stops the local extrema Sifting Process by proceeding to stop step 310 if the residual signal $r_n$ has more than 2 extrema. Otherwise, the method proceeds to step 320.

In other words, Step 310 stops the local extrema Sifting Process if the residual signal $r_n$ is monotonically increasing or decreasing. This stopping criterion is based on the fact that an IMF cannot be extracted from a monotonic function. If $r_n$ is not monotonically increasing/decreasing, then a next iteration is performed beginning with step 320.

Even for data with zero mean, the final residue still can be different from zero. For data with a trend, the final residue should be that trend.

In summary, the Sifting Process decomposes the physical signal X(t) into a series of intrinsic mode functions and a residue which may be expressed as:

$$X(t) = \sum_{i=1}^{n} c_i + r_n. \tag{8}$$

In other words, the invention extracts a series of IMFs by sifting the physical signal with a computer implemented Empirical Mode Decomposition method. This IMF series cannot be generated or derived by any analytic method. It can only be extracted by the invention through a specially programmed computer through the Sifting Process (local extrema or curvature extrema type).

Curvature Extrema Sifting Process

The local extrema Sifting Process described above is, as the name implies, based on the local extrema of the physical signal. Although this local extrema Sifting Process is an excellent tool, it has difficulty analyzing a composite signal having a weak signal component that cannot itself generate local extrema in the composite signal. This weak signal component physically represents a separate time scale in the physical signal, but often becomes a so-called "hidden scale" that could not be reliably found by the local extrema Sifting Process.

To permit resolving and analyzing such hidden scales, the improvements described herein apply a curvature extrema Sifting Process to amplify the hidden scales. The implementation of this procedure is based on the following discussion of the characteristic time scale.

When interpreting any set of physical data, the most relevant parameters are the time scale and the energy distribution with respect to the time scale. Until now no clear definition of the local time scale has been presented. In Fourier analysis, time scale is defined as the periods of continuous and constant amplitude trigonometric components. As discussed in the parent application, such a definition only provides a global averaged meaning to the energy and time scale. As such, the Fourier definitions are totally divorced from the reality of time variations of either the amplitude or the frequency.

Statistical Definitions of the time scale have been made by Rice, S. O. [Mathematical Analysis of Random Noise. Bell Sys. Tech. J. 23, 282–310 (1944); Power Spectrum and Correlation Functions, Bell Sys. Tech. J. 23, 310–332 (1944); Mathematical Analysis of Random Noise, Bell Sys. Tech. J. 24, 46–108 (1945); Noise Through Nonlinear Devices, Bell Sys. Tech. J. 24, 109–156 (1945)]. In this series of papers, Rice computes the expected number of zero-crossings, and the extrema for any data under linear, stationary and normal distribution assumptions. Mathematically, the time scales are defined for any data x(t), as follows: the locations of t for x(t)=0 is defined as the location of the zero-crossings. The time spacing betweens successive zero-crossings is the zero-crossing time scale. Furthermore:

the locations of t for $$\dot{x}(t)=0$$

are defined as the locations of the extrema. The time spacing between successive extrema is the extrema time scale and is used in the local extrema Sifting Process as described above.

Under the linear, stationary and normal distribution assumptions, the expected number of zero crossings $N_0$ is given by:

$$N_0^2 = \frac{1}{\pi}\left(\frac{m_2}{m_0}\right)$$

and the expected number of extrema $N_e$ is given by:

$$N_e^2 = \frac{1}{\pi}\left(\frac{m_4}{m_2}\right)$$

in which $m_I$ is the I-th moment of the Fourier spectrum.

Although Rice's definitions are rigorous, they only offer a global measure of the signal. Furthermore, the Rice definitions cannot be applied to nonlinear and/or nonstationary data.

Because of the limitations set forth in Rice's assumptions, his results have also created some paradoxes: in may data sets, the number of the expected extrema computed from the above formula becomes unbounded. This is because the Fourier power spectra usually have asymptotic power law forms. For example, if the spectrum has a −3 power law spectrum, the $m_2$ is unbounded. For white noise or a delta functions, the spectrum is white and the zero crossing is undefined. Because most data sets are assumed to be linear and stationary, the question arises as to why one cannot apply Rice's formula. For example, ocean wave data has an asymptotic frequency spectrum which has a power law between −4 and −5. Then, according to the above formula, the expected number of extrema $N_e$ is unbounded. Yet, one can certainly count the extrema without any difficulty. This dilemma, however, has not alerted investigators to question Rice's formulae and the assumptions involved, but it has led most to reject any formula that involves moments higher than the 4th. Such an approach limited the past statistical measure of time scale to the computation of zero-crossings which is too crude to be of any real use.

The spacing of extrema does offer a measure of the time scale and can be used to measure wide band data with multiple riding waves. Refined as the extrema criterion is, it still lacks precision sometimes. By examining the data in closer detail, it can be found that the extrema spacing can miss some subtle time scale variations especially when a weak signal oscillation is overwhelmed by a larger oscillation.

To remedy this imprecision, the curvature extrema Sifting Process was invented. To account for the weak signal or hidden scale, this invention introduces another type of time scale based on the variation of curvature. In this regard, a conventional curvature function $$\ddot{X}/(1+\dot{x})^{3/2}$$

is utilized by the invention to introduce a curvature based time scale and curvature extrema Sifting Process. In terms of mechanics, this conventional curvature function is a measure of weighted acceleration: any change of sign in curvature in displacement time series indicates a change of sign in the force. As such, the curvature variation indeed has strong dynamic significance. As described above, the local extrema statistics has encountered difficulties already. If applied to the curvature function, the expected number of extrema in curvature would involve the 8th moment of the spectrum from the data. Fortunately, this difficulty is an artifact and the consequence of the linear and stationary assumptions invoked. One certainly can compute the curvature and its extrema, then count them. Consequently, the failure of the Rice model is another indication of the falsehood of the commonly invoked linearity and stationarity assumptions.

According to the invention, there are now three ways to measure the time spans: between successive zero-crossings, between successive extrema, and between successive curvature extrema. The last measure based on curvature extrema is newly introduced in this application and will be fully described in relation to the flowcharts of FIGS. 1(*d*)–(*e*) below.

The curvature extrema Sifting Process is based on the local extrema Sifting Process described in relation to FIGS. 1(*b*)–(*c*) above. The basic difference is the method of determining extrema for the Sifting Process.

More specifically, the curvature extrema Sifting Process begins in FIG. 1(*d*) with the digitized physical signal from step 105 (FIG. 1(*a*)). The frame end points step 107 described above may then be applied to the physical signal.

Then, step 500 computes the curvature function of the physical signal by applying the curvature equation above. Once the curvature function is computed, the invention finds extrema in the curvature function (step 510).

Step 520 then identifies corresponding curvature extrema corresponding to extrema values in the curvature function. Step 520 may be performed by recording the time at which each extrema in the curvature function occurs then finding corresponding data points in the physical data at those same time instances.

Step 530 then identifies local extrema in the physical data in a manner similar to steps 200 and 220 in the local extrema Sifting Process of FIG. 1(*b*).

The local extrema and the curvature extrema are then combined to form a total set of extrema in step 540.

The optional intermittency test (steps 550 and 555) may then be applied to the total set of extrema. This intermittency test is equivalent to the intermittency test described above (steps 201, 202, 221 and 222).

Then the upper and lower envelopes may be constructed in step 560 based on the total set of extrema. Furthermore, an envelope mean is calculated by step 570. These steps are essentially the same as the local extrema Sifting Process with the difference being the set of extrema utilized to construct the envelopes and envelope mean. Similarly, remainder of the Sifting Process is nearly identical as indicated by the like reference numerals applied in FIG. 1(*e*).

The steps that recursively and iteratively apply the curvature extrema Sifting Process differ from the local extrema Sifting Process. Namely, the recursion executed by step 265 loops back to step 580 (FIGS. 1(*d*)–(*e*)) in the curvature extrema Sifting Process which identifies the local extrema in the physical signal. Furthermore, the iteration executed by step 320 loops back to step 500, described above, which begins the identification of curvature extrema.

In this way, the invention utilizes (1) local extrema for the component signal that is generated at each recursion of the curvature extrema Sifting Process and which becomes the physical signal during the next recursion and (2) curvature extrema and local extrema for the residual signal that is generated at each iteration of the curvature extrema Sifting Process and which becomes the physical signal during the next iteration.

Examples of Curvature Extrema Sifting Process

The first example is a mathematical model in which a low frequency strong signal X1 (FIG. 4(*a*) is added to a high frequency weak signal X2 (FIG. 4(*b*)) having an amplitude of only 2% of strong signal X1 to generate a composite signal X (FIG. 4(*c*)).

FIG. 4(*d*) illustrates the curvature function of composite signal X generated by step 500. FIG. 4(*e*) shows the composite signal X with both the local extrema and curvature extrema. From the total set of extrema, the upper and lower envelopes may be constructed in a manner similar to that shown in FIG. 3(*b*).

Figure 5A:
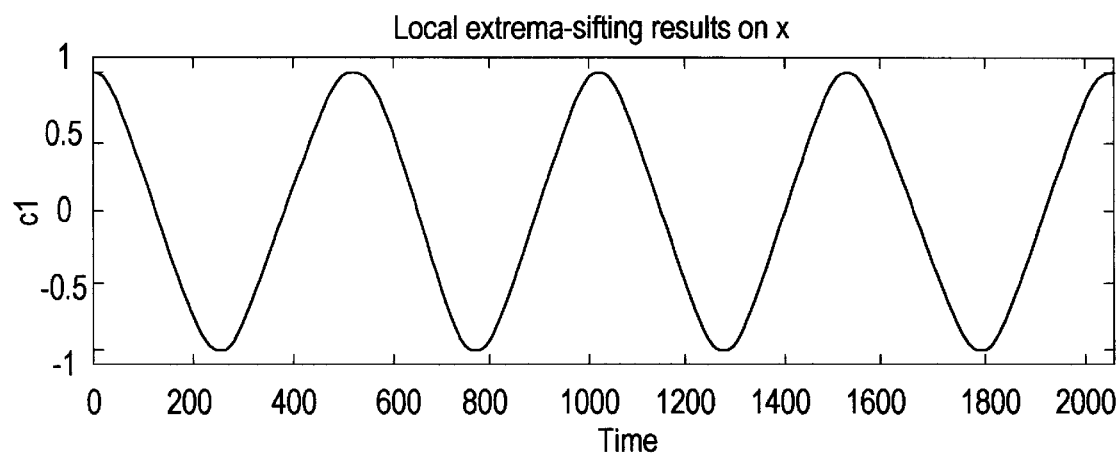
FIGS. 5(a)–(b) are graphs of the first and second intrinsic mode functions (c1 and c2, respectively) when the local extrema Sifting Process is applied to the signal X of FIG. 4(c)
Figure 5B:
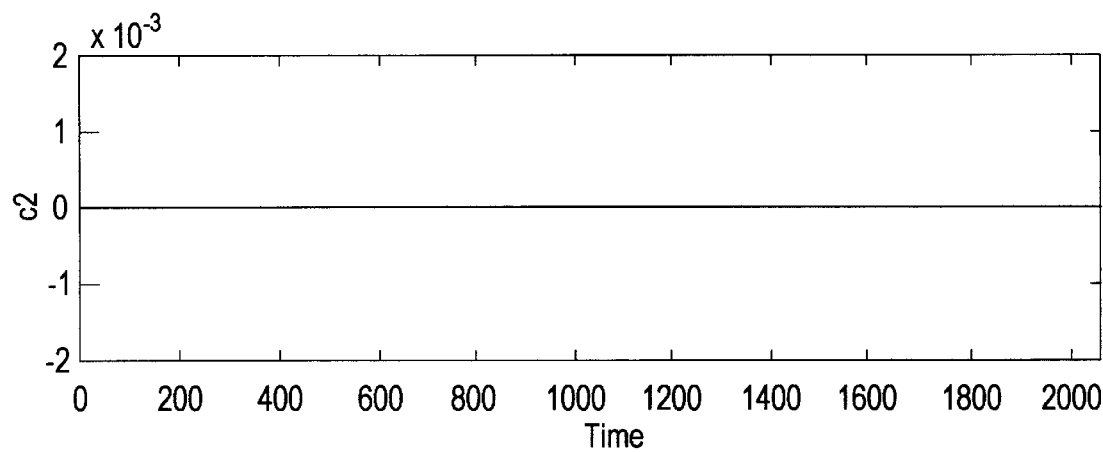

Because of the small amplitude of X2 relative to X1, the weak signal X2 cannot generate local extrema in the composite signal X (see FIG. 4(*c*)). Therefore, the local extrema Sifting Process only produces two Intrinsic Mode Functions c1 and c2 shown in FIGS. 5(*a*)–(*b*), respectively. Actually, there is only one IMF c1 which corresponds to the strong signal X1 and the second IMF c2 is essentially zero. Thus, the local extrema Sifting Process fails to resolve the second IMF corresponding to the weak signal X2.

Figure 6A:
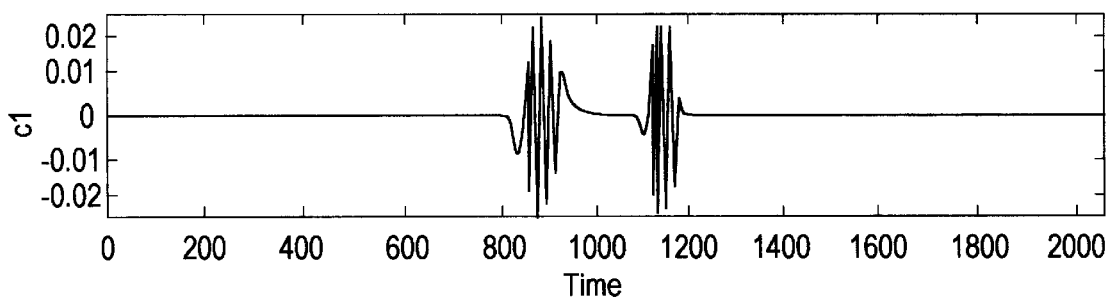
FIGS. 6(a)–(c) are graphs of the first, second, nd third intrinsic mode functions (c1, c2, and c3 espectively) when the curvature extrema Sifting Process is applied to the signal X of FIG. 4(c) and illustrate the advantages of this invention over the local extrema Sifting Process.
Figure 6B:
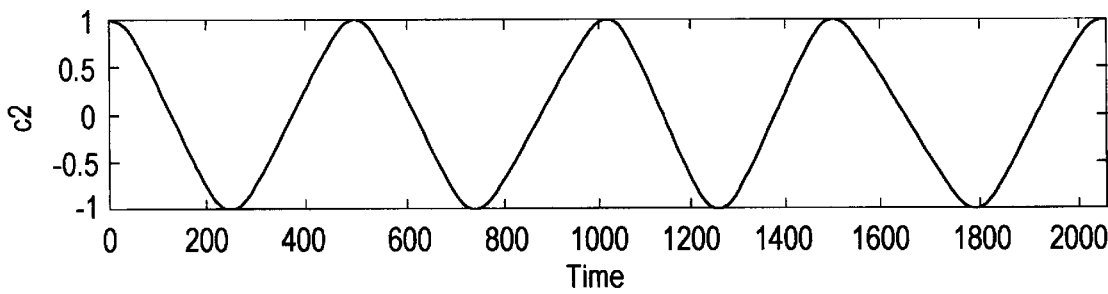
Figure 6C:
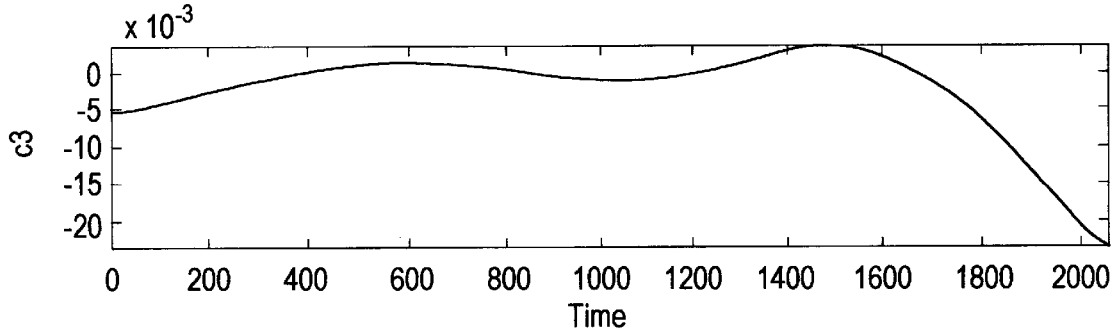

In contrast, the curvature extrema Sifting Process (with the optional intermittency test) is able to resolve both signals X1 and X2 by generating two meaningful IMF's c1 and c2 shown in FIGS. 6(*a*)–(*b*). A third IMF c3 is also generated but this is a residual error (FIG. 6(*c*)) that has such a small amplitude, on the order of O ($10^{-5}$), as to be negligible.

Before going further, a few words to differentiate the intermittency and curvature siftings are necessary. Both methods are designed to take certain anomalies out of the data. For intermittency sifting to work, the signals have to have waves in which the extrema will show-up. In other words, the signal strength has to be strong. For curvature sifting to work, the signal strength does not have to be strong. Once the curvature computation reveals the hidden scales, as in FIGS. 4(*d*) and 4(*e*), the intermittency sifting may have to be invoked to separate this scale from that of the underlying longer waves. In summary, the intermittency and curvature are separate sifting options, which can be used separately or in conjunction to sort out signal anomalies.

Figure 7:
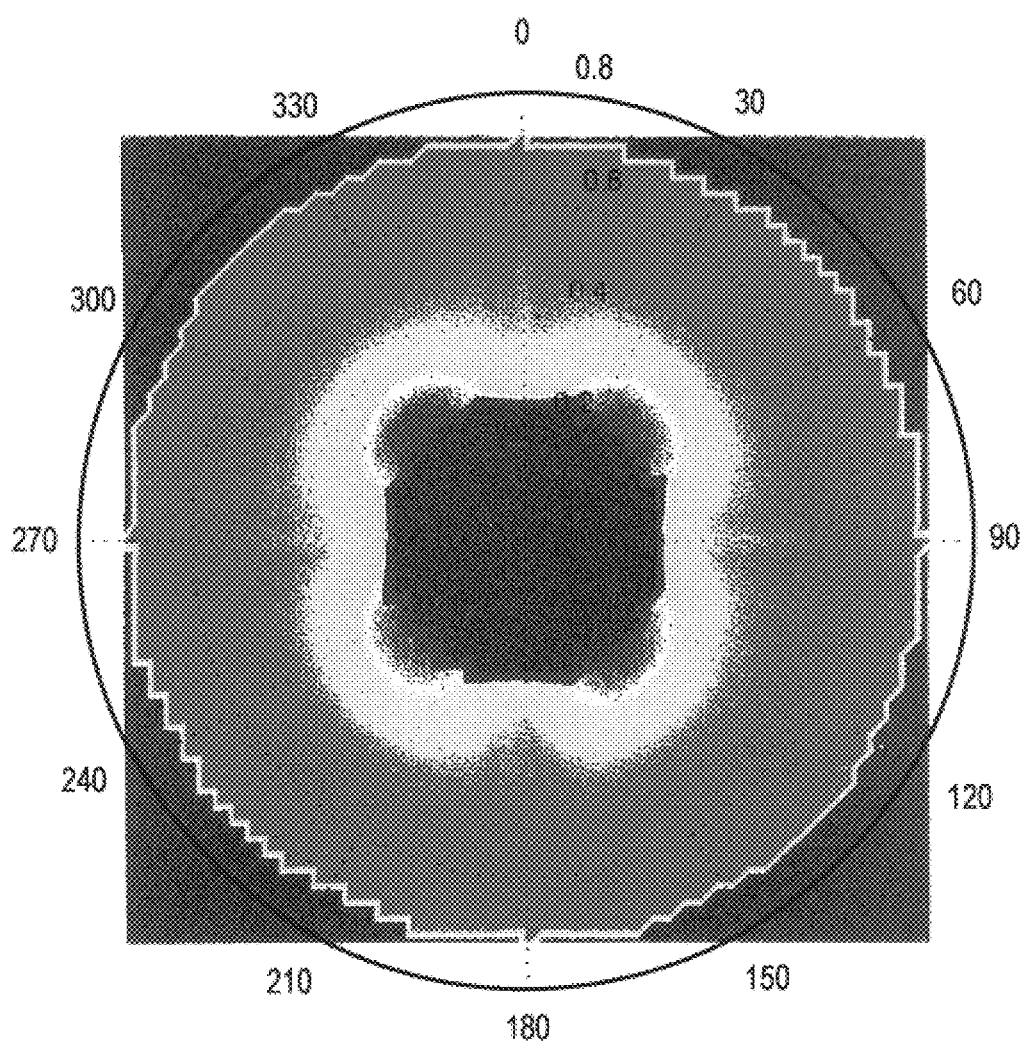
FIG. 7 illustrates an axial velocity field measured at eight different radii in the wake of a body with a propeller for explaining the computer implemented Empirical Mode Decomposition method of the invention using curvature extrema.
Figure 8:
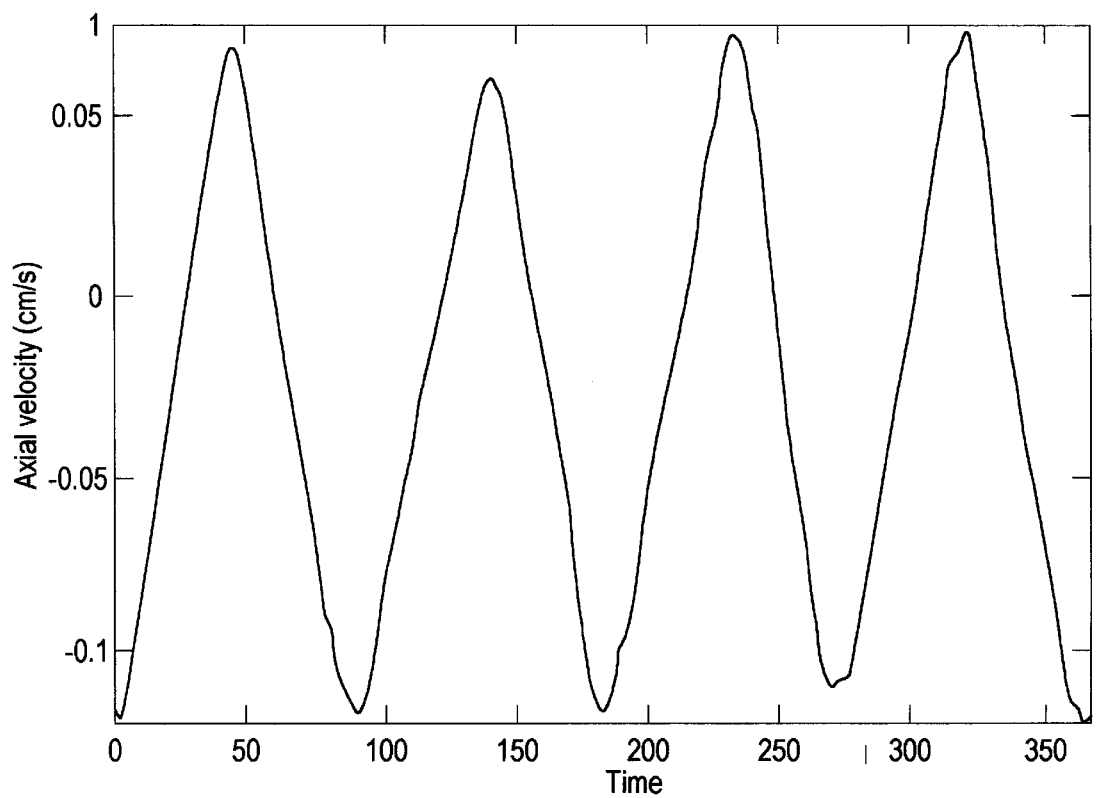
FIG. 8 illustrates a typical axial velocity measured at a fixed radius in the wake of a body with a propeller for explaining the computer implemented Empirical Mode Decomposition method of the invention using curvature extrema.
Figure 9A:
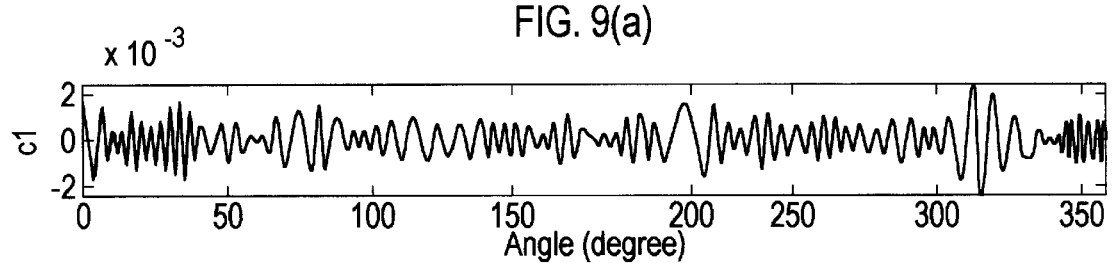
FIGS. 9(a)–(e) are graphs of the first, second, third, fourth and fifth intrinsic mode functions (c1, c2, c3, c4 and c5 respectively) when the local extrema Sifting Process is applied to the axial velocity signal FIG. 8.
Figure 9B:
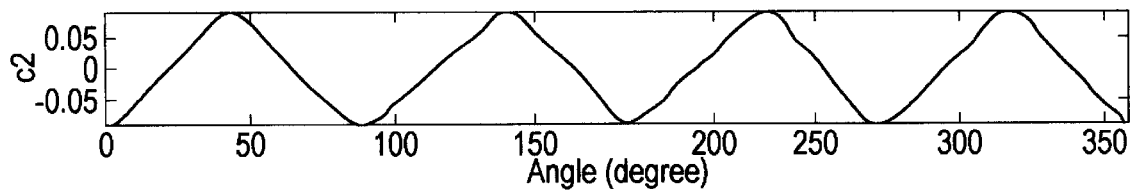
Figure 9C:
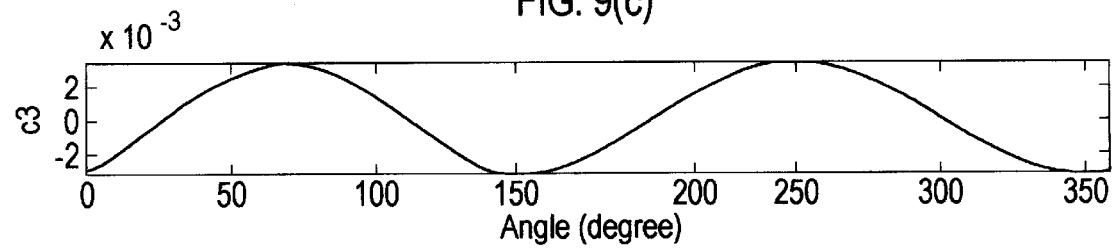
Figure 9D:
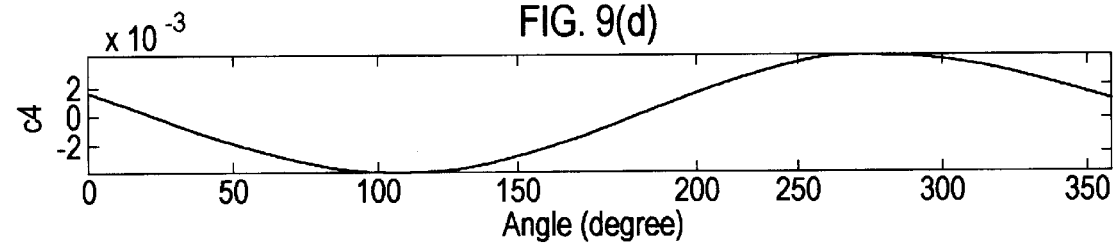
Figure 9E:
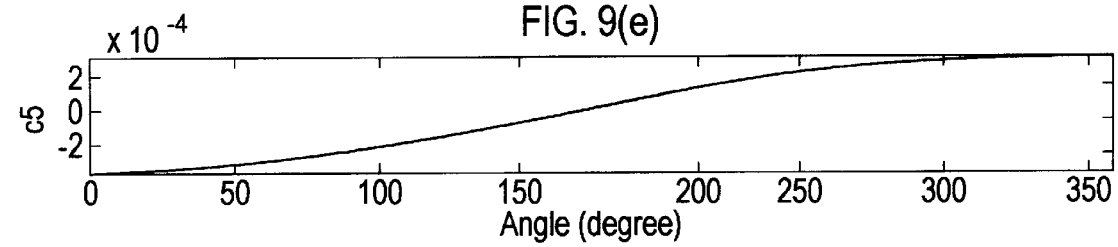
Figure 10A:
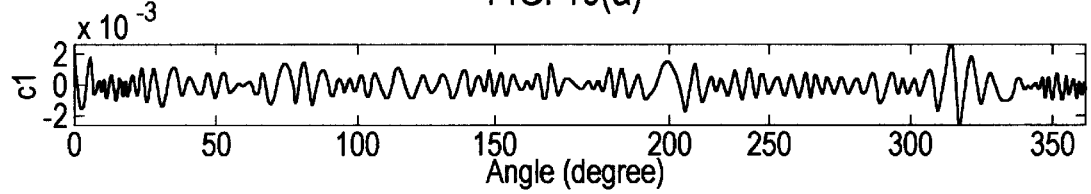
FIGS. 10(a)–(g) are graphs of the first, second, third, fourth, fifth, sixth an seventh intrinsic mode functions (c1, c2, c3, C4, c5, c6 and c7, respectively) when the curvature extrema Sifting Process is applied (with the intermittency test) to the axial velocity of FIG. 8(c) and illustrate the advantages of this invention over the local extrema Sifting Process.
Figure 10B:
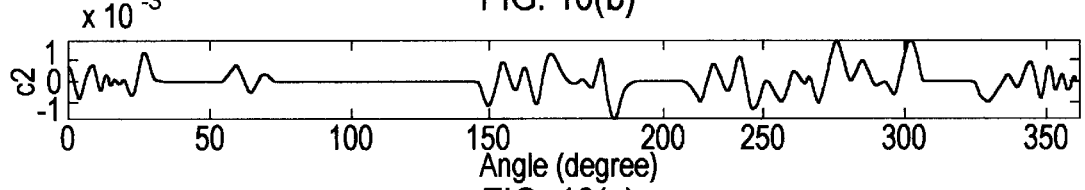
Figure 10C:
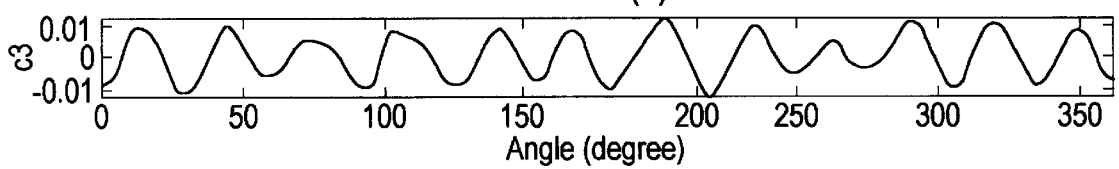
Figure 10D:
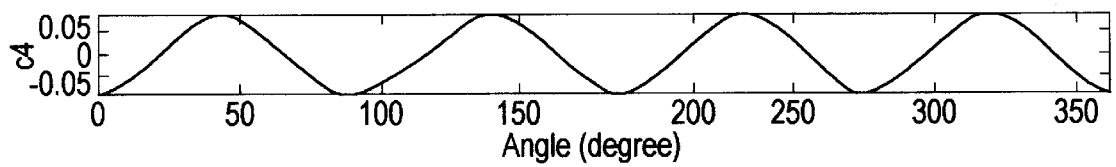
Figure 10E:
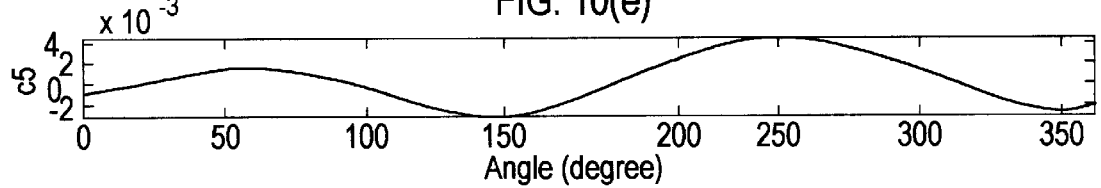
Figure 10F:
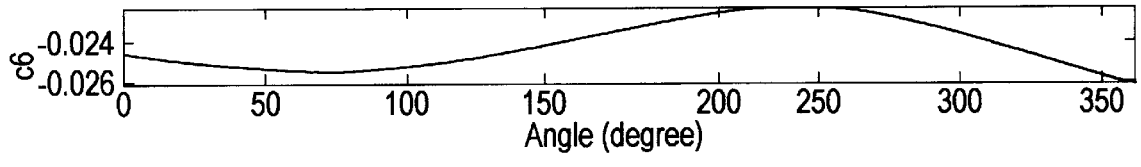
Figure 10G:
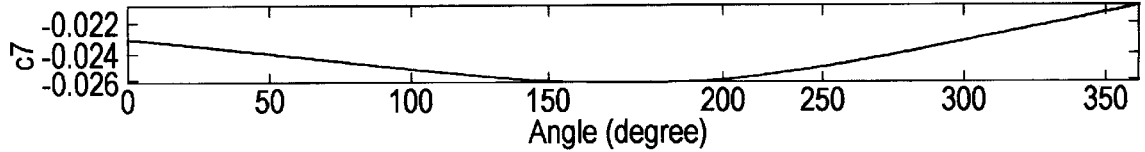

FIG. 7 provides a real fluid mechanics data set that further illustrates the advantages of the curvature extrema Sifting Process. The data set shown in FIG. 7 represents the axial velocity field in the wake of body with a propeller measured at eight different radii. The composite velocity field is shown in FIG. 7. FIG. 8 is a graph derived from FIG. 7 showing propeller axial velocity for a fixed radius against angle (degrees).

Applying the local extrema Sifting Process to the physical data set of FIG. 8 results in only five IMF's c1–c5 shown in FIGS. 9(*a*)–(*e*), respectively. The IMF component c2 clearly contains additional modes, as suggested by the visible variation of the data line. Since the sub-modes are all weak, it is impossible to extract them from the data by applying the local extrema Sifting Process.

In contrast, applying the curvature extrema Sifting Process to the physical data set of FIG. 8 results in seven IMF's c1–c7 shown in FIGS. 10(*a*)–(*g*). The low frequency components are about the same as those generated by the local extrema Sifting Process. The differences are the additional IMF's c2 and c3. One of the additional modes, c3, contains substantial amounts of energy. It contains 12 waves; therefore, it represents 12 modes. Furthermore, mode four is much cleaner in the curvature extrema Sifting (IMF c4 in FIG. 10(*d*)) than mode four in the local extrema Sifting Process (IMF c2 in FIG. 9(*b*)).

Figure 11A:
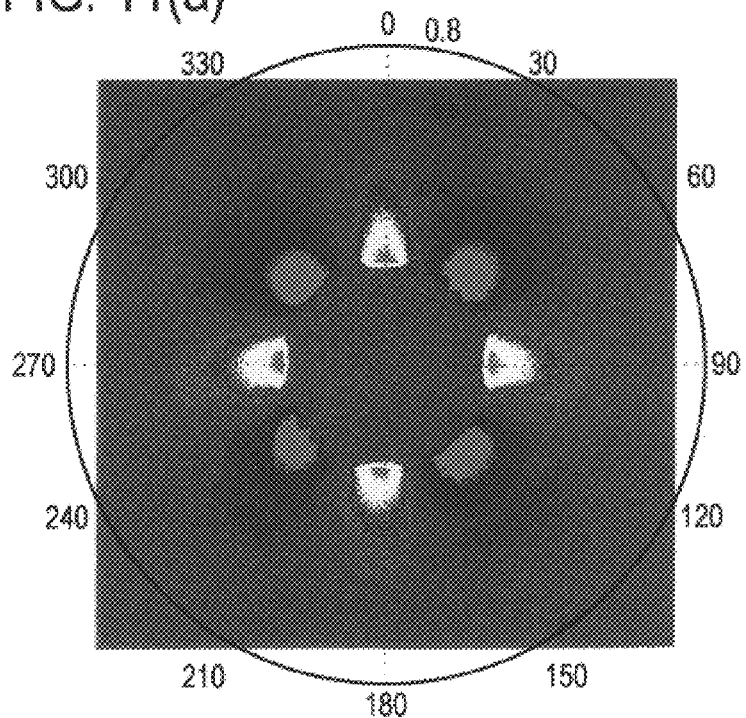
FIG. 11(a) is a reconstruction of the flow pattern generated from the first to fourth intrinsic mode functions produced by the local extrema Sifting Process.
Figure 11B:
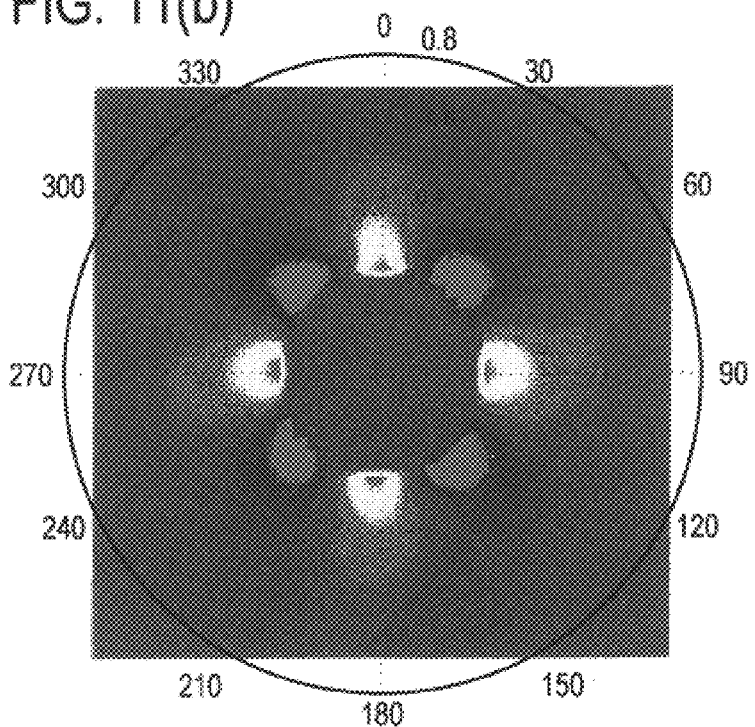
FIG. 11(b) is a reconstruction of the flow pattern from the first to fourth intrinsic mode functions from the curvature extrema Sifting Process.

To further confirm the validity and accuracy of the curvature extrema Sifting Process, the flow pattern reconstructed from the fourth mode from both Sifting Processes (local extrema and curvature extrema) are shown in FIGS. 11(*a*)–(*b*), respectively. Overall, the reconstructions are very similar. On detailed examination, one can find the local extrema based sifting result in FIG. 11(*a*) is more irregular and asymmetric that the curvature extrema based sifting reconstruction shown in FIG. 11(*b*).

Figure 12:
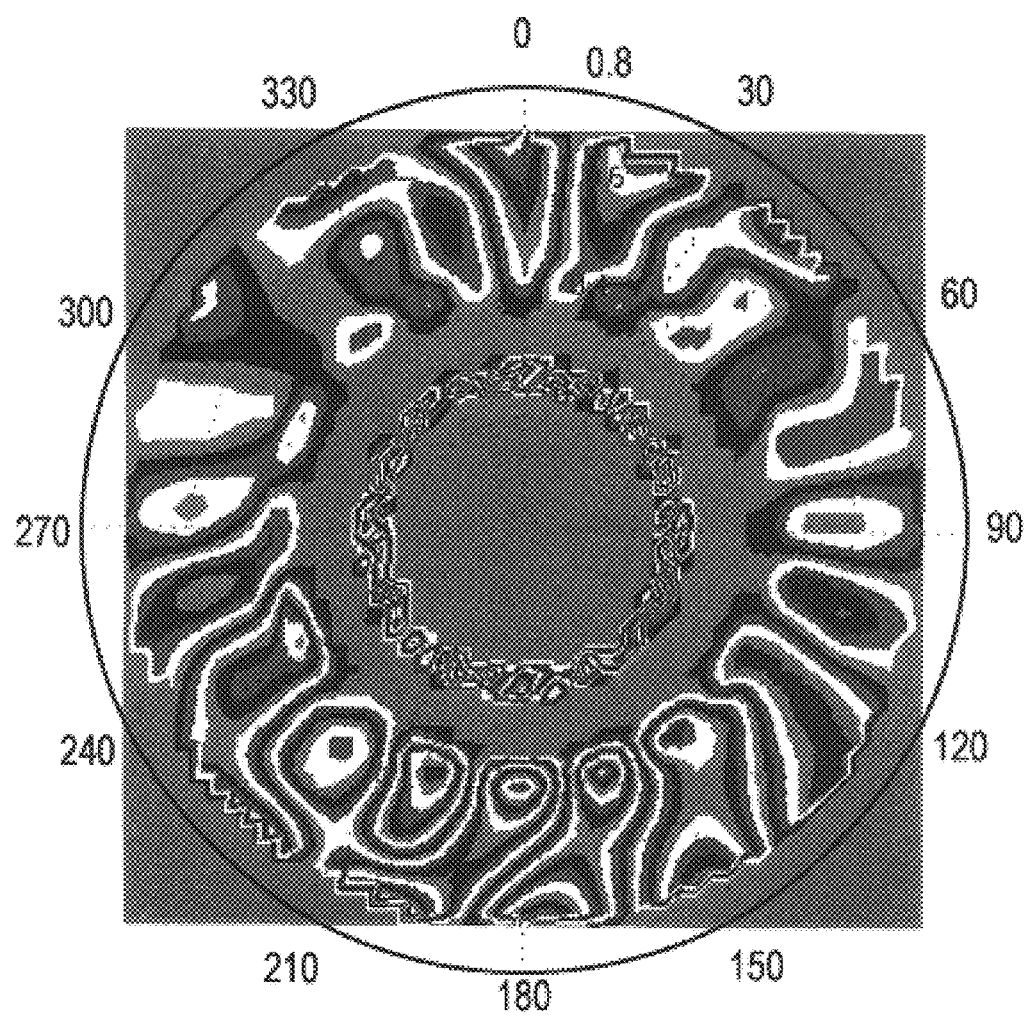
FIG. 12 is a reconstruction of the flow pattern generated from intrinsic mode functions produced by the curvature extrema Sifting Process.

This indicates that the curvature extrema Sifting Process indeed can produce a clearer and purer mode than the local extrema Sifting Process. FIG. 12 illustrates the flow pattern of the additional modes (c3 of the curvature extrema Sifting Process shown in FIG. 10(*c*)). Thus, the curvature extrema Sifting Process generates a more detailed result, in this and similar cases.

The above examples illustrate the value of the curvature extrema Sifting Process. In general, the intermittency test (steps 550–555) should be applied. Moreover, the curvature extrema Sifting Process usually generates more IMF's than the local extrema. Sifting Process. Furthermore, the curvature extrema Sifting Process should be monitored carefully especially when the signal to noise ratio of the physical signal is low which could result in noise corruption and false readings.

As a general guide, the local extrema Sifting Process should be used first. If problems are detected in the results, the curvature extrema Sifting Process should be applied.

Computer for Implementing Inventive Method

A computer suitable for programming with the inventive method is diagrammatically shown in the block diagram of FIG. 2. The computer 410 is preferably part of a computer system 400. To allow human interaction with the computer 410, the computer system includes a keyboard 430 and mouse 435. The computer programmed with the inventive method is analogous to a mechanical sieve: it separates digital data into series of IMF's according to their time scales in a manner analogous to a mechanical sieve which separates aggregated sand according to their physical size.

Because the invention is applied to analyze physical signals, the computer system 400 also includes an input device 440, sensor 442 and/or probe 444 which are used to sample a physical phenomenon and generate physical signal representative thereof. More particular examples of such inputs (440, 442 and 444) are described in relation to FIGS. 21–25.

To output the results of the computer implemented method, the computer system 400 also includes a display 450 such as a cathode ray tube or flat panel display, printer 460 and output device 470. Each of these outputs (450, 460, 470) should have the capability to generate color outputs because, for example, the Hilbert Spectrum may be in color.

Furthermore, the computer system 400 also includes a mass storage device 420. The mass storage device 420 may be a hard disk, floppy disc, optical disc, etc. The mass storage device 420 may be used to store a computer program which performs the invention when loaded into the computer 410. As an alternative, the input device 440 may be a network connection or off-line storage which supplies the computer program to the computer 410.

More particularly, the computer program embodiment of the invention may be loaded from the mass storage device 420 into the internal memory 415 of the computer 410. The result is that the general purpose computer 410 is transformed into a special purpose machine that implements the invention.

Even more particularly, each step of inventive method will transform at least a portion of the general purpose computer 410 into a special purpose computer module implementing that step. For example, when the sifting step 120 is implemented on the computer 410, the result is a computer implemented sifting apparatus (sifter) that performs the sifting functions of sifting step 120.

Other embodiments of the invention include firmware embodiments and hardware embodiments wherein the inventive method is programmed into firmware (such as EPROM, PROM or PLA) or wholly constructed with hardware components. Constructing such firmware and hardware embodiments of the invention would be a routine matter to one of ordinary skill using known techniques.

Article of Manufacture

Still further, the invention disclosed herein may take the form of an article of manufacture. More specifically, the article of manufacture is a computer-usable medium, including a computer-readable program code embodied therein wherein the computer-readable code causes computer 410 to execute the inventive method.

A computer diskette such as disc 480 in FIG. 2 is an example of such a computer-usable medium. When the disc 480 is loaded into the mass storage device 480, the computer-readable program code stored therein is transferred into the computer 410. In this way, the computer 410 may be instructed to perform the inventive methods disclosed herein.

Illustration of Local Extrema Sifting Process

To further illustrate the Local Extrema Sifting Process, consider FIG. 13(*a*) which shows a physical signal representing wind data collected in a laboratory wind-wave tunnel with a high frequency response Pitot tube located 10 cm above the mean water level. The wind speed was recorded under the condition of an initial onset of water waves from a calm surface. Clearly, the physical signal is quite complicated with many local extrema but no zero-crossings such that the time series represents all positive numbers.

Although the mean can be treated as a zero reference, defining it is difficult, for the whole process is transient. This example illustrates the advantage of adopting the successive extrema for defining the time scale and the difficulties of dealing with nonstationary data. In fact, a physically meaningful mean for such data is impossible to define using standard methods, the EMD eliminates this difficulty.

FIG. 13(*b*) shows the wind speed signal of FIG. 13(*a*) on a different scale for comparison purposes. FIGS. 13(*c*)–(*k*) show all the IMFs obtained from repeatedly sifting the wind speed signal in FIG. 13(*b*). The efficiency of the invention is also apparent: the local extrema Sifting Process produces a total of 9 intrinsic mode function. components while the Fourier transform needs components which number as many as half of the total number of points in a given window to represent the wind data with the same accuracy.

The separation of the wind speed data into locally non-overlapping time scale components is clear from FIGS. 13(*c*)–(*k*). In some components, such as $c_1$ and $c_3$, the signals are intermittent, then the neighboring components might include oscillations of the same scale, but signals of the same time scale would never occur at the same locations in two different IMF components.

The components of the EMD are usually physical, for the characteristic scales are physically meaningful.

To further confirm the validity and completeness of the Sifting Process, the wind speed signal can be reconstructed from the IMF components. FIGS. 14(*a*)–(*i*) show this reconstruction process starting from the longest period IMF to the shortest period IMF in sequence. For example, FIG. 14(*a*) shows the wind speed signal and the longest period component, $c_9$, which is actually the residue trend, not an IMF.

By itself, the fitting of the trend is quite impressive, and it is very physical: the gradual decrease of the mean wind speed indicates the lack of drag from the calm surface initially and the increasing of drag after the generation of wind waves. As the mean wind speed deceases, the amplitude of the fluctuation increases, another indication of wind-wave interactions.

By adding the next longest period component, $c_8$, the trend of the sum, $c_9+c_8$, takes a remarkable turn, and the fitting to the wind speed signal looks greatly improved as shown in FIG. 14(*b*). Successively adding more components with increasing frequency results in the series of FIGS. 14(*c*)–(*i*). The gradual change from the monotonic trend to the final reconstruction is illustrative by itself. By the time the sum of IMF components reaches $c_3$ in FIG. 14 (*g*) essentially all the energy contained in the wind speed signal is recovered. The components with the highest frequencies add little more energy, but they make the data look more complicated. In fact, the highest frequency component is probably not physical, for the digitizing rate of the Pitot tube is too slow to capture the high frequency variations. As a result, the data are jagged artificially by the digitizing steps at this frequency. The difference between the original data and the re-constituted set from the IMF's is given in FIG. 14(*j*). The magnitude of the difference is $10^{-15}$, which is the limit of the computer 410.

The Hilbert Spectrum

Having obtained the Intrinsic Mode Function components (through either the local extrema or curvature extrema Sifting Processes), the next step in the computer implemented method is to apply the Hilbert Transform to each component and generate the Hilbert Spectrum as shown in step 140 in FIG. 1(*a*).

A brief tutorial on the Hilbert transform with emphasis on its physical interpretation can be found in Bendat and Piersol, 1986, "Random Data: Analysis and Measurement Procedures", 2nd Ed., John Wiley & Sons, New York, N.Y. Essentially, the Hilbert transform is the convolution of X(t) with 1/t. This convolution emphasizes the local properties of X(t). In more formal terms, given a time series X(t), the Hilbert Transform Y(t) can be expressed as $$Y(t) = \frac{1}{\pi} P \int_{-\infty}^{\infty} \frac{X(t')}{t-t'} dt' \qquad (13)$$

where P indicates the Cauchy principal value.

With this definition, X(t) and Y(t) form a complex conjugate pair. This complex conjugate pair Z(t) may be expressed as:

$$Z(t) = X(t) + iY(t) = a(t)e^{i\theta(t)}, \qquad (14)$$

in which $$a(t) = [X^2(t) + Y^2(t)]^{\frac{1}{2}}, \qquad (15)$$

$$\theta(t) = \arctan \frac{X(t)}{Y(t)}. \qquad (16)$$

After performing the Hilbert transform to each IMF component, we can express the time series data X(t) in the following form:

$$X(t) = \sum_{j=1}^{n} a_j(t) e^{i \int \omega_j(t) dt}. \qquad (17)$$

In Equation (17), the residue, $r_n$, is purposefully omitted, for it is either a monotonic function, or a constant. Although the Hilbert transform can treat the monotonic trend as part of a longer oscillation, the energy involved in the residual trend could be overpowering. In consideration of the uncertainty of the longer trend, and in the interest of information contained in the other low energy and higher frequency components, the final non-IMF component should be left out. It, however, could be included, if physical considerations justify its inclusion.

Note that Equation (17) gives both amplitude and frequency of each component as functions of time. It should be pointed out that no analytical method can generate the expression in Equation (17). Instead, all the components may be extracted only by a specially programmed computer applying the inventive Sifting Process and the Hilbert transform. The variable amplitude and frequency have not only greatly improved the efficiency of the expansion, but also enabled the expansion to accommodate nonstationary data. With IMF expansion, the amplitude and the frequency modulations are also clearly separated.

Equation (17) also enables the computer implemented method to represent the amplitude and frequency as functions of time in a three-dimensional plot, in which the amplitude can be contoured on the frequency-time plane. This frequency-time distribution of the amplitude is designated as the Hilbert Amplitude Spectrum, H(ω, t), or simply Hilbert Spectrum. Thus we have:

$$H(\omega, t) = \sum_{j=i}^{n} a_j(t) e^{i \int \omega_j(t) dt} \qquad (18)$$

In which H(ω, t) is the Hilbert spectrum of the frequency (ω) and time (t) and $a_j(t)$ is the j-th component of the IMF. In the presentation, the amplitude (with or without smoothing) can be expressed in color maps, black-grey maps, or contour maps. Color maps, however, greatly increase the operator's ability to fully analyze the spectrum. In some cases, a color map will permit the operator to discern relationships and trends that would not be apparent in black-grey maps thereby making a color display a necessary component in some cases.

If amplitude squared is more desirable to represent energy density, then the squared values of amplitude can be substituted to produce a Hilbert Energy Spectrum just as well.

Figure 15A:
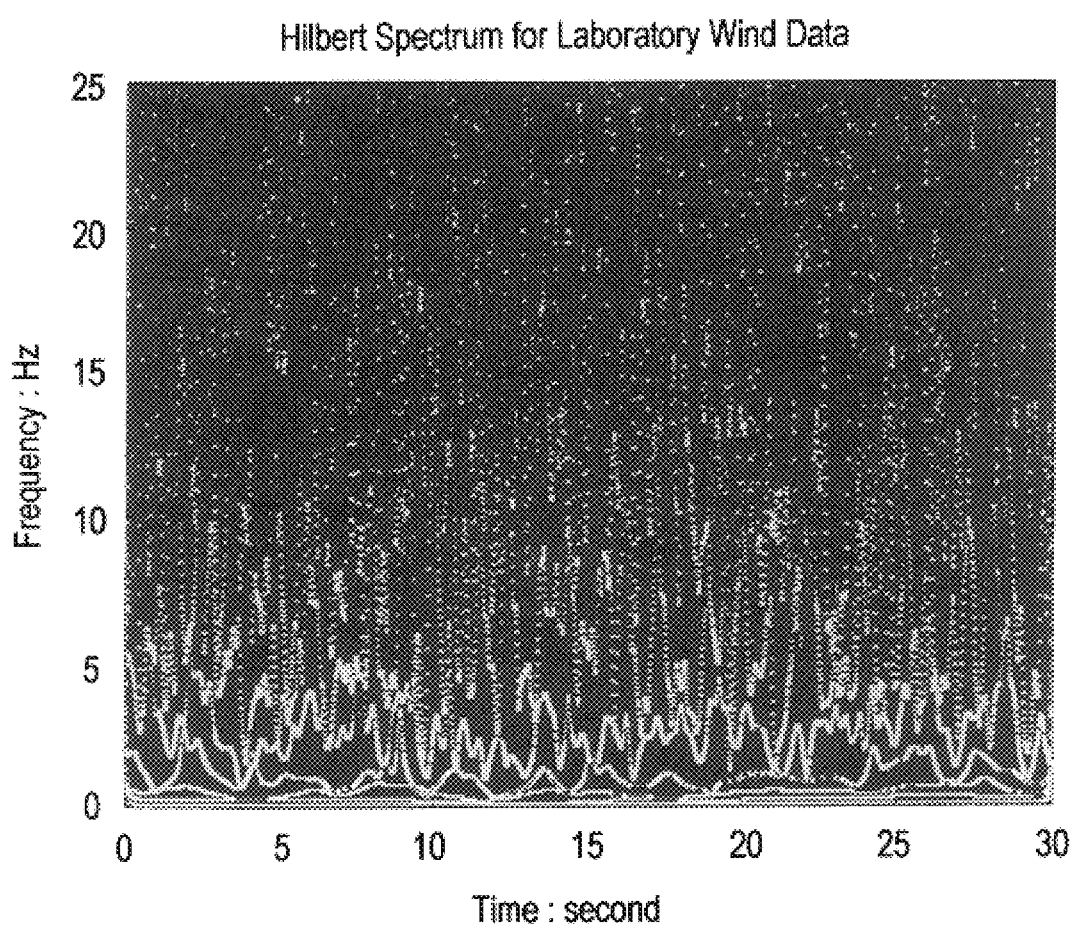
FIG. 15(a) is the Hilbert Spectrum generated by the invention from the wind speed data of FIG. 13(a)
Figure 15B:
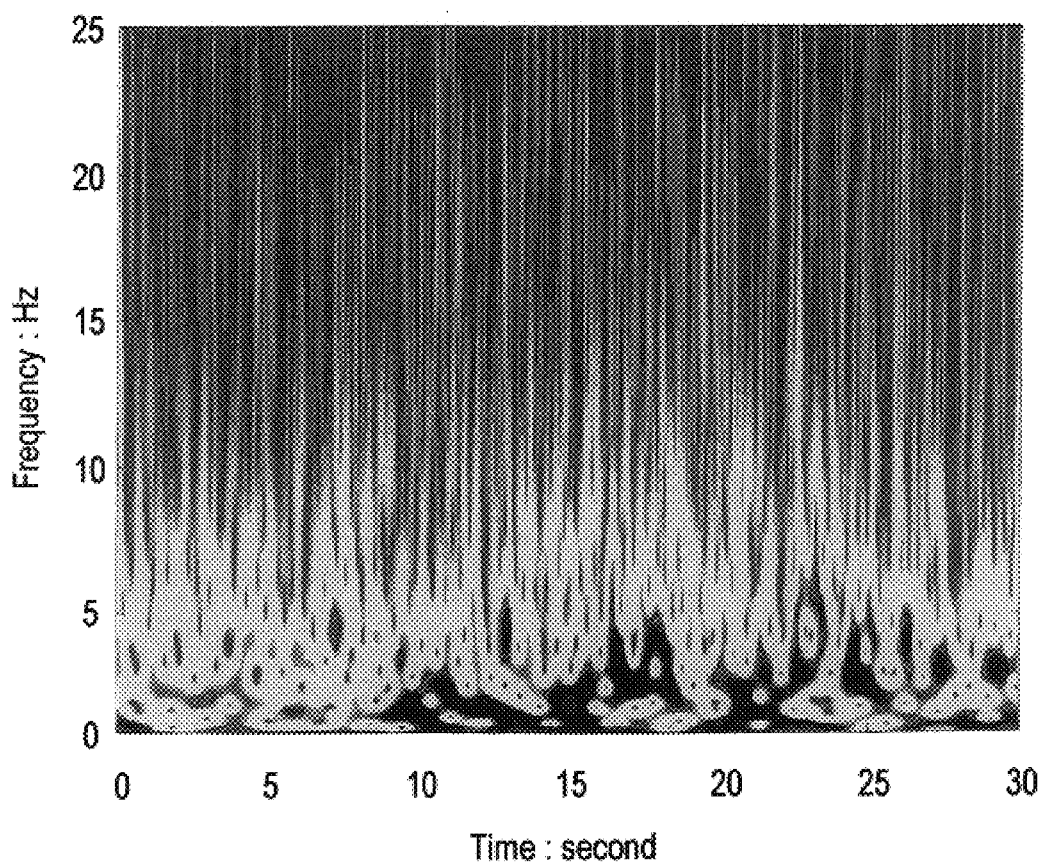
FIG. 15(b) is the conventional Morlet Wavelet spectrum generated from the wind speed data of FIG. 13(a)

Various forms of Hilbert spectra presentations can be generated by the computer in the display step 190: both color coded maps and contour maps may be employed to present the Hilbert spectra with or without smoothing. The Hilbert Spectrum in the color map format for the wind data is shown in FIG. 15(a). The Hilbert spectrum in FIG. 15(a) gives a very different appearance when compared with the corresponding Wavelet spectrum shown in FIG. 15(b). While the Hilbert Spectrum in FIG. 15(a) appears only in the skeleton form with emphasis on the frequency variations of each IMF, the Wavelet analysis result gives a smoothed energy contour map with a rich. distribution of higher harmonics.

Figure 15C:
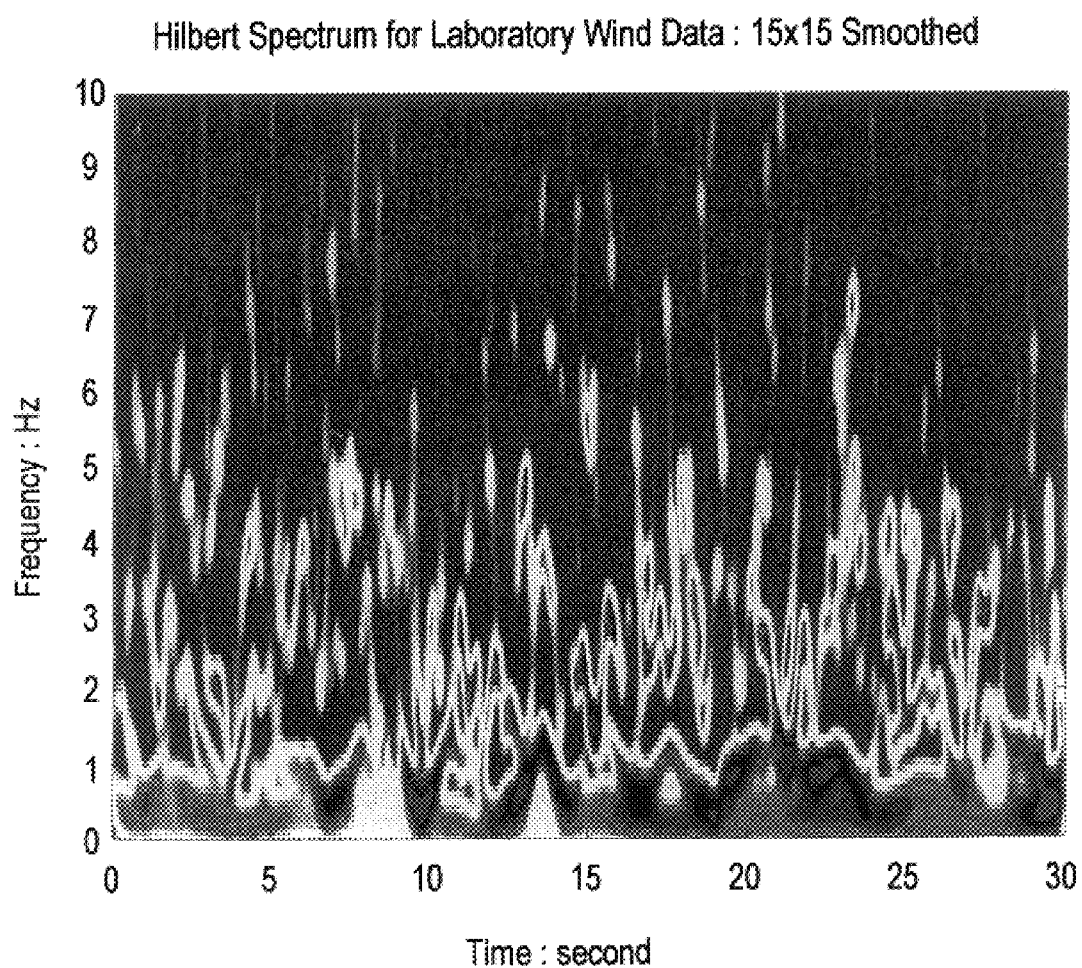
FIG. 15(c) shows the Hilbert Spectrum of FIG. 6(a) after smoothing by a 15×15 weighted Gaussian smoothing filter.

If a more continuous form of the Hilbert Spectrum is preferred, a smoothing method can be optionally. applied in step 155. The first type of a smoothing. method which may be used in the invention is a weighted spatial filter which averages over a range of cells. For example, a 15 by 15 weighted Gaussian filter may be employed in step 155 as is known in the art to smooth this data. FIG. 15(c) shows the result of applying the 15 by 15 weighted Gaussian filter.

Although smoothing step 155 degrades both frequency and time resolutions, the energy density and its trends of evolution as functions of frequency and time are easier to identify. In general, if more quantitative results are desired, the original skeleton presentation is better. If more qualitative results are desired, the smoothed presentation is better. As a guide, the first look of the data is better in the smoothed format.

The alternative of the spatial smoothing is to select a lower frequency resolution and leave the time axis undisturbed. The advantages of this approach are the preservation of events' locations and a more continuous frequency variation. Furthermore, a lower frequency resolution saves computation time for the computer implemented method.

To optimize such computation time, the optimal frequency resolution in the Hilbert spectrum can be computed as follows. Let the total data length be T, and the digitizing rate of the sensor be Δt. Then, the lowest frequency that can be extracted from the data is 1T /Hz, which is also the limit of frequency resolution for the data. The highest frequency that can be extracted from the data is 1/(n Δt) Hz, in which n represents the minimum number of Δt needed to define the frequency accurately.

Because the Hilbert transform defines instantaneous frequency by differentiation, more data points are needed to define an oscillation. The absolute minimum number of data points is five for a whole sine wave. Although a whole sine wave is not needed to define its frequency, many points within any part of the wave are needed to find a stable derivative. Therefore, the maximum number of the frequency cells, N, of the Hilbert spectrum should be $$N = \frac{\frac{1}{n\Delta t}}{\frac{1}{T}} = \frac{T}{n\Delta t}. \qquad (19)$$

In order to make the derivative stable, the data is averaged over three adjacent cell values for the final presentation.

Figure 13A:
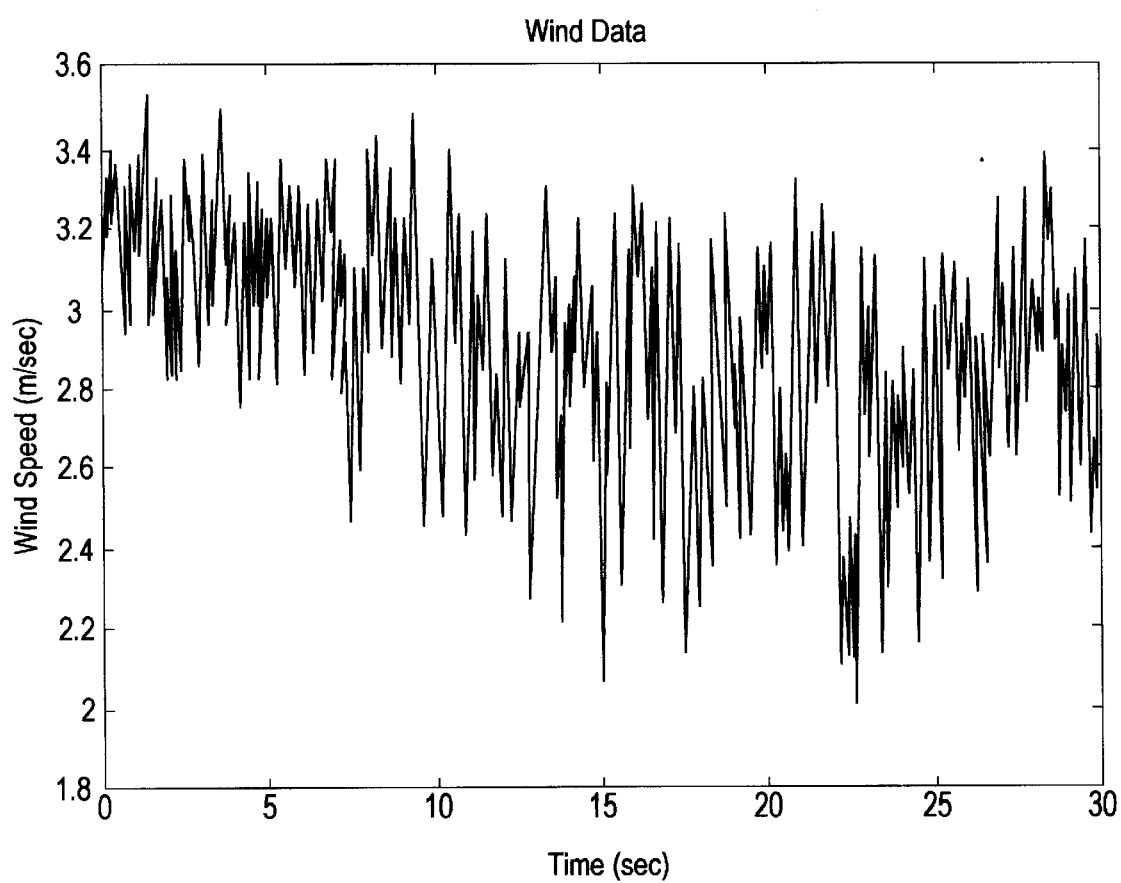
FIG. 13(a) is a graph of a wind speed signal which is for explaining the computer implemented Empirical Mode Decomposition method of the invention.
Figure 13B:
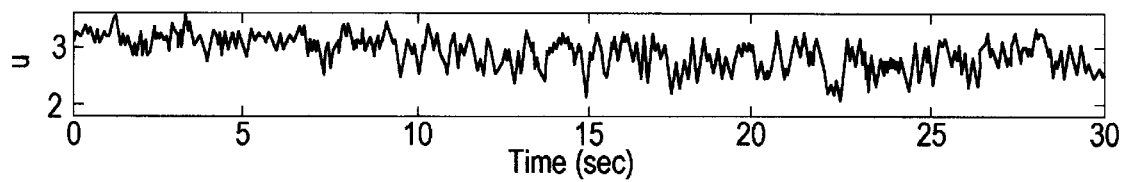
FIGS. 13(b)–(k) show the wind speed signal and the nine intrinsic mode functions which are extracted from the wind speed signal by the EMD method of the invention.
Figure 13C:
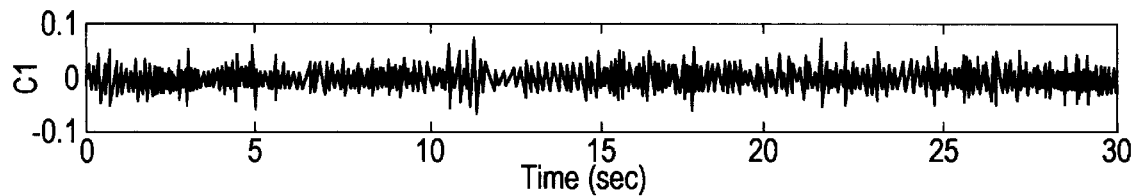
Figure 13D:
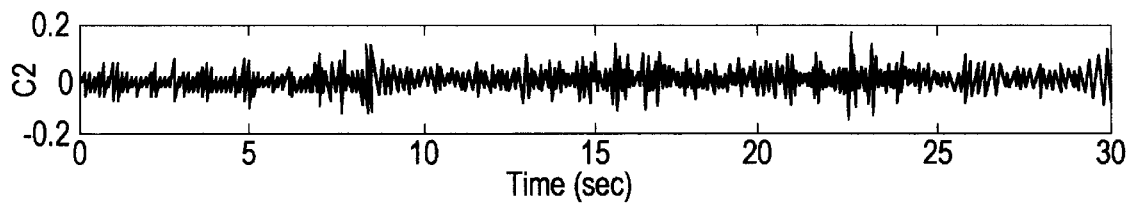
Figure 13E:
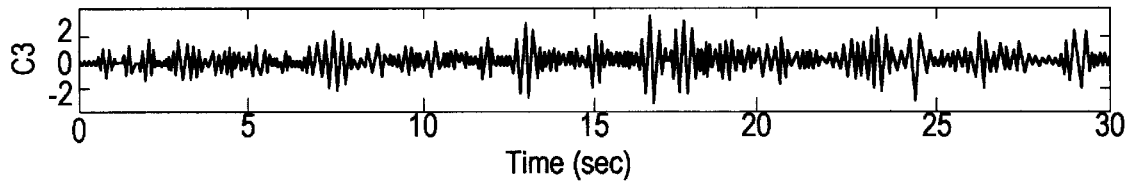
Figure 13F:
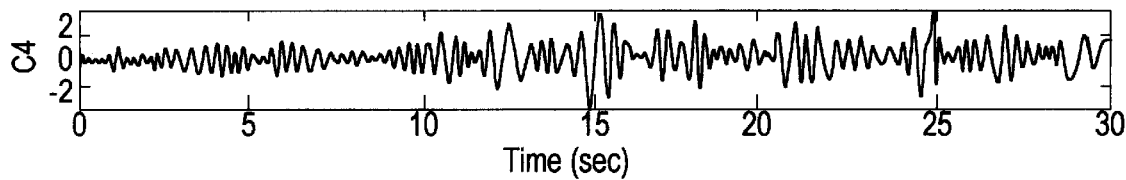
Figure 13G:
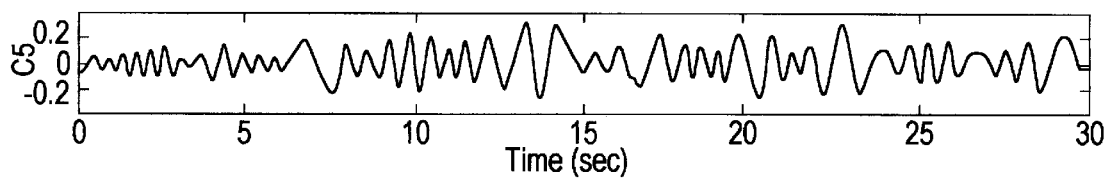
Figure 13H:
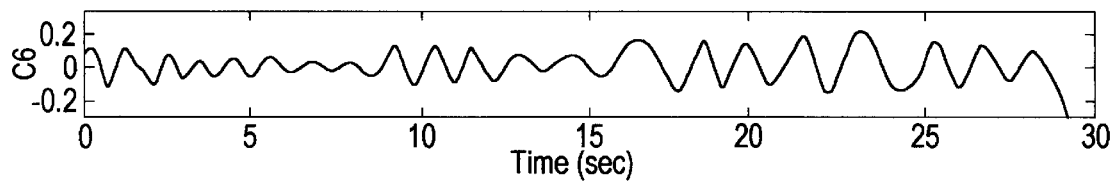
Figure 13I:
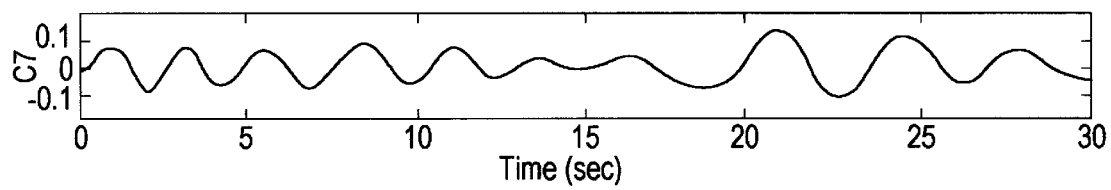
Figure 13J:
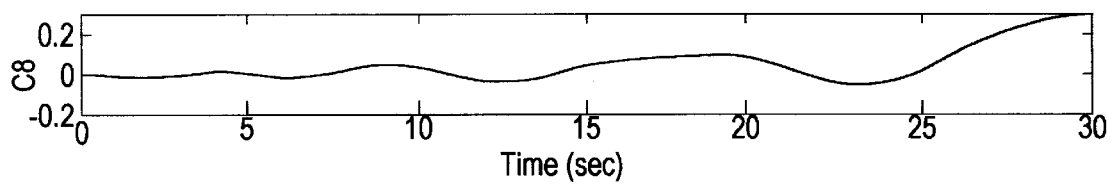
Figure 13K:
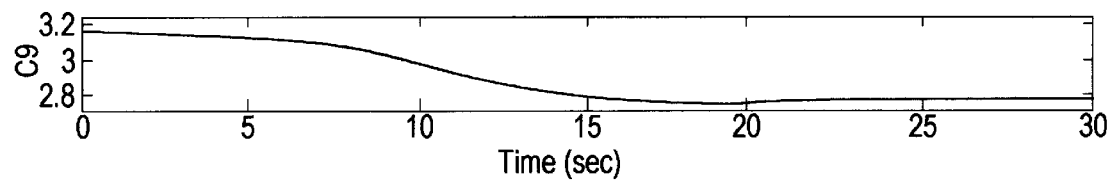
Figure 14A:
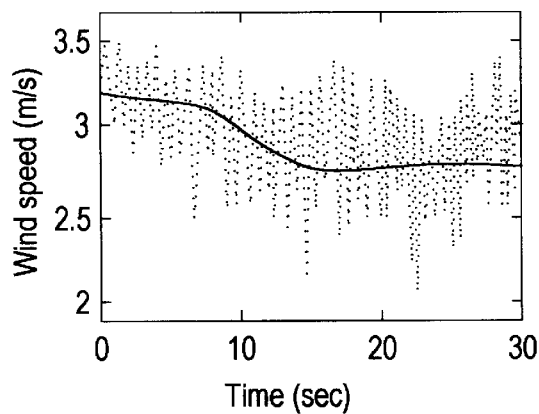
FIGS. 14(a)–(j) are a series of graphs illustrating the successive reconstruction of the original wind speed data from the intrinsic mode functions.
Figure 14B:
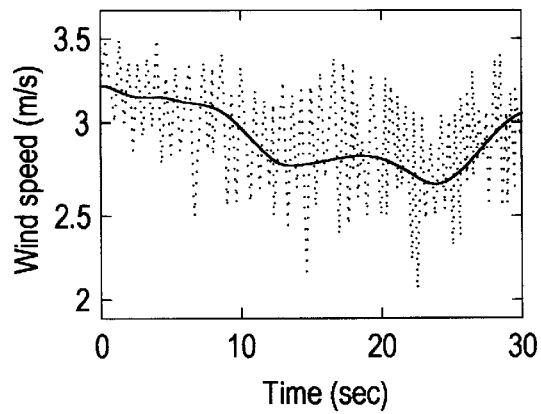
Figure 14C:
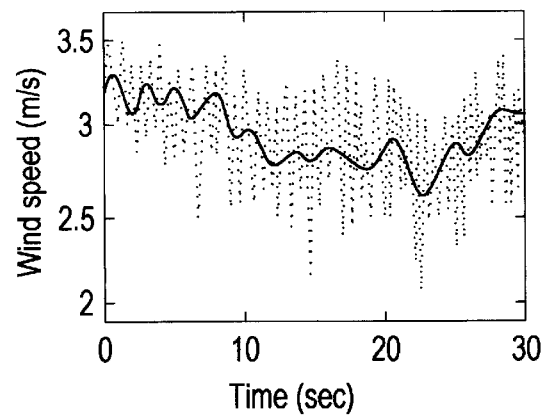
Figure 14D:
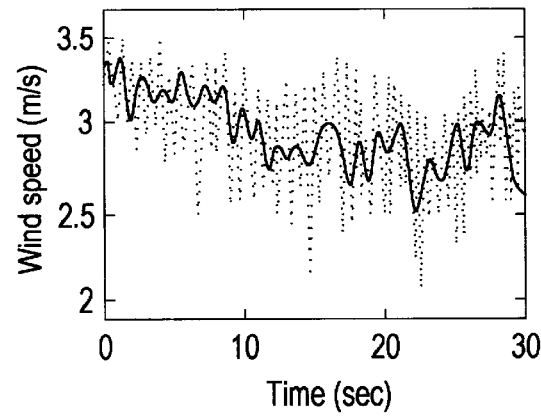
Figure 14E:
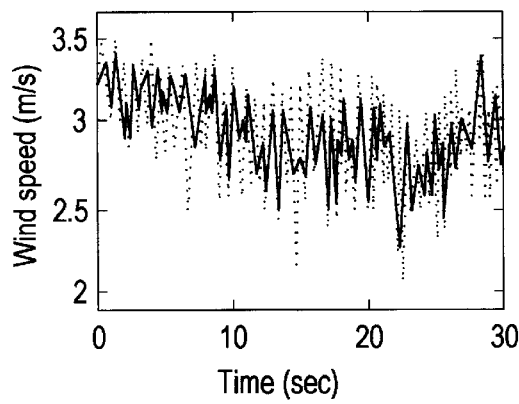
Figure 14F:
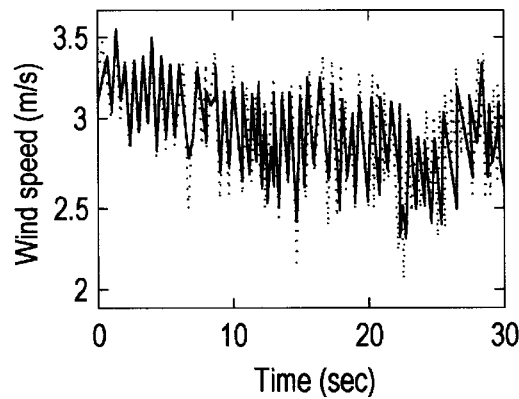
Figure 14G:
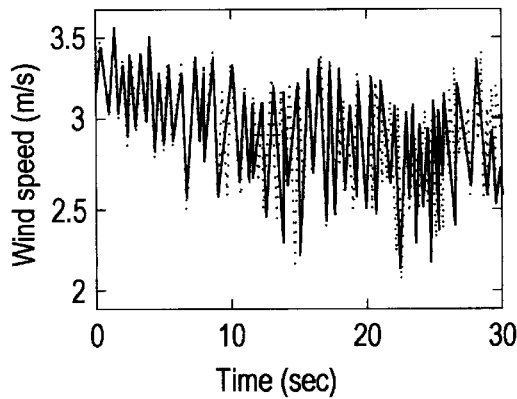
Figure 14H:
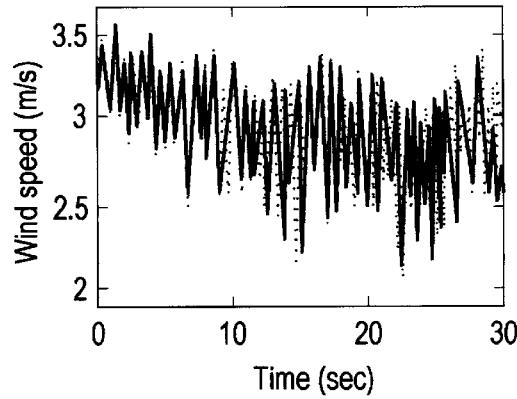
Figure 14I:
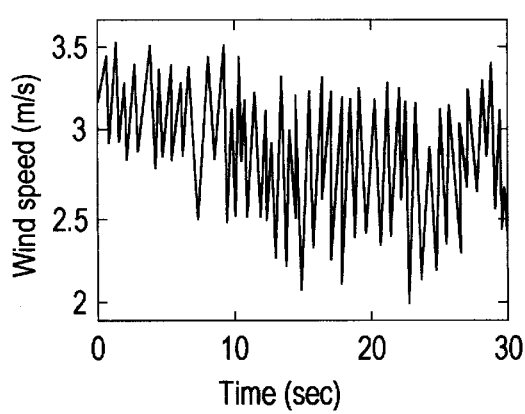
Figure 14J:
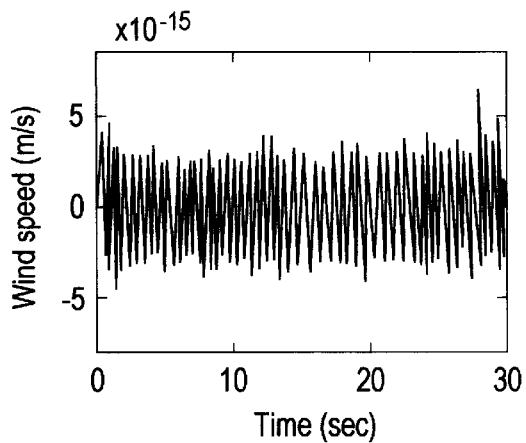

To illustrate, consider the wind data of FIG. 13(a) which was digitized at a rate of 0.01 seconds and has a total length of 30 seconds. Therefore, the highest frequency that can be extracted is 25 Hz. The total cell size could be 600, but they have been averaged to 200 in FIG. 15(a).

Marginal Spectrum

The marginal spectrum offers a measure of total amplitude (or energy) contribution from each frequency value. In other words, the marginal spectrum represents the cumulated amplitude over the entire data span.

As shown in FIG. 1(a), the marginal spectrum is calculated by the computer implemented method in step 145 after applying the Hilbert Transform in step 140. The marginal spectrum is the Hilbert Spectrum integrated through all time. In this simplification, the time coordinate is lost as in the Fourier spectral analysis, which leaves a summary of the frequency content of the event. Therefore, this presentation should only be used when the phenomena being analyzed is stationary. Formally, the marginal spectrum h(ω) is defined as:

$$h(\omega) = \int_0^T H(\omega, t) dt. \tag{20}$$

Because there is no analytic expression for H(ω, t), the integration can only be performed in a computer as a sum.

Figure 16:
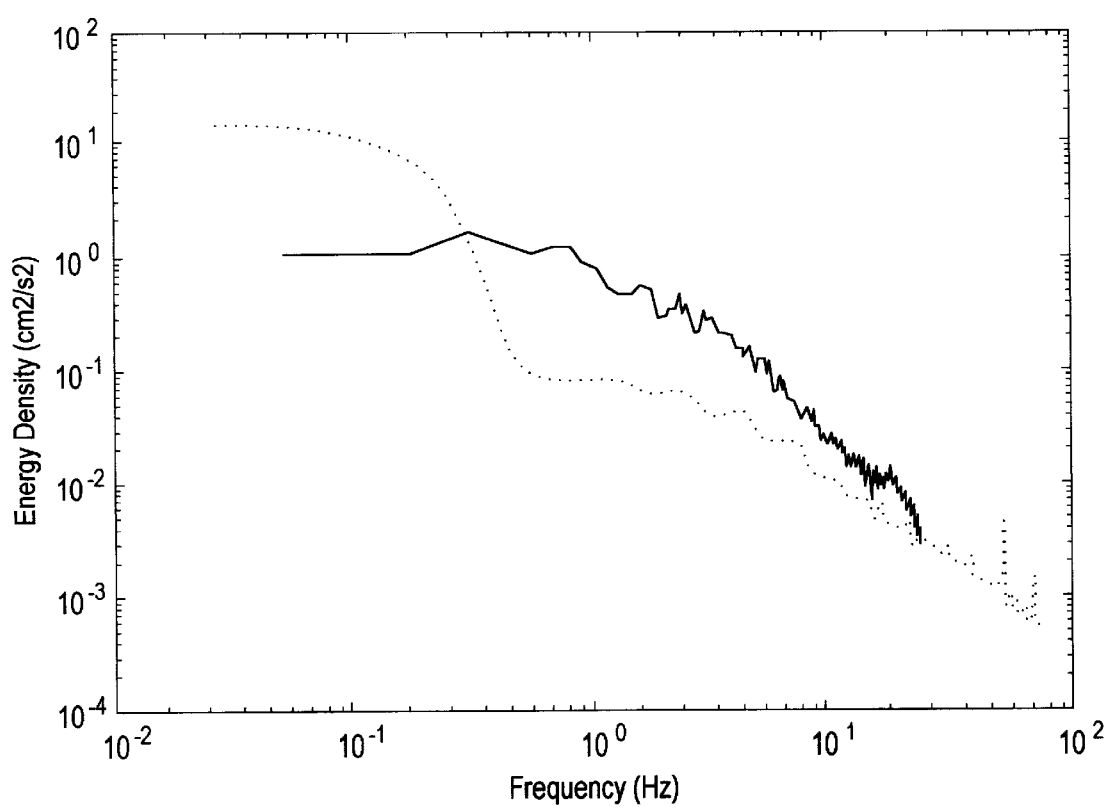
FIG. 16 is a comparison of the marginal Hilbert spectrum (solid line) and the fourier spectrum (dotted line) which were generated from the wind speed signal of FIG. 13(a)

An example of a marginal spectrum is shown in FIG. 16. More particularly, FIG. 16 shows the corresponding marginal spectrum of the Hilbert Spectrum given in FIG. 15(a).

The frequency in either H(ω, t) or h(ω) has a totally different meaning from results generated by applying Fourier spectral analysis. In the Fourier representation, the existence of energy at a frequency, ω, means a component of a sine or a cosine wave persisted through the time span of the data.

In contrast, the existence of energy at the frequency, ω, means only that, in the whole time span of the data, there is a higher likelihood for such a wave to have appeared locally. In fact, the Hilbert Spectrum is a weighted non-normalized joint amplitude-frequency-time distribution. The weight assigned to each time-frequency cell is the local amplitude. Consequently, the frequency in the marginal spectrum indicates only the likelihood of an oscillation with such a frequency exists. The exact occurrence time of that oscillation is given in the full Hilbert spectrum.

To illustrate this difference, the corresponding Fourier Spectrum of the wind speed signal is also given in FIG. 16 using a dotted line. As can be observed, there is little similarity between the Fourier spectrum and the marginal spectrum. While the Fourier spectrum is dominated by the DC term because of the non-zero mean wind speed, the marginal spectrum gives a nearly continuous distribution of energy. The Fourier spectrum is meaningless physically, because the data is not stationary. In contrast, the marginal spectrum provides a physically meaningful interpretation of the wind speed signal.

Instantaneous Frequency

There are two types of frequency modulation: the inter-wave and the intra-wave modulations. The first type is familiar because the frequency of the oscillation gradually changes as the waves disperse. Technically, in dispersive waves, the frequency is also changing within one wave, but that is generally not emphasized either for convenience, or for lack of a more precise frequency definition. The second type is less familiar, but it is also a common phenomenon:

if the frequency changes from time to time within a wave its profile can no longer be a simple sine or cosine function. Therefore, any wave profile deformation from the simple sinusoidal form implies intra-wave frequency modulation.

In the past, such phenomena were treated as harmonic distortions. Nevertheless, such deformations should be viewed as intra-wave frequency modulation because the intra-wave frequency modulation is a more physically meaningful term.

In order to understand these frequency modulations, the invention applies a unique definition of instantaneous frequency. This definition stems from the EMD method and requires the signal to be reduced into IMF components. After extracting the IMF components, an instantaneous frequency value can be assigned to each IMF component. Consequently, for complicated data in which more than one IMF may be extracted by EMD, there can be more than one instantaneous frequency at a time locally.

With the Hilbert Transform, a unique definition of instantaneous frequency may be applied by the computer implemented method as illustrated by step 160. Step 160 calculates the instantaneous frequency which is formally defined as follows:

$$\omega(t) = \frac{d\theta(t)}{dt}. \tag{21}$$

By calculating instantaneous frequency, step 160 of the invention permits the frequency value to be defined for every point with the value changing from point to point.

The validity and the implications of the instantaneous frequency for nonlinear signals may be analyzed by examining an idealized Stokes wave in deep water. The wave profile of such a Stokeian wave is modeled by $$X(t) = \cos(\omega t + \epsilon \sin \omega t) \tag{22}$$

Therefore, it is a intra-wave frequency modulated signal. Approximately, equation (18) can be shown to be:

$$X(t) = (1 + \epsilon/2)\cos \omega t + \epsilon \cos 2\omega t + \tag{23}$$

The wave profile is also shown in FIG. 18(a). Because the intra-wave frequency can only be approximated by harmonics in Fourier analysis, we can still have the same profile, but not the same frequency content. The wave form shows sharpened crests and rounded off troughs, which make the crests and troughs asymmetric with respect to the mean surface.

Figure 18C:
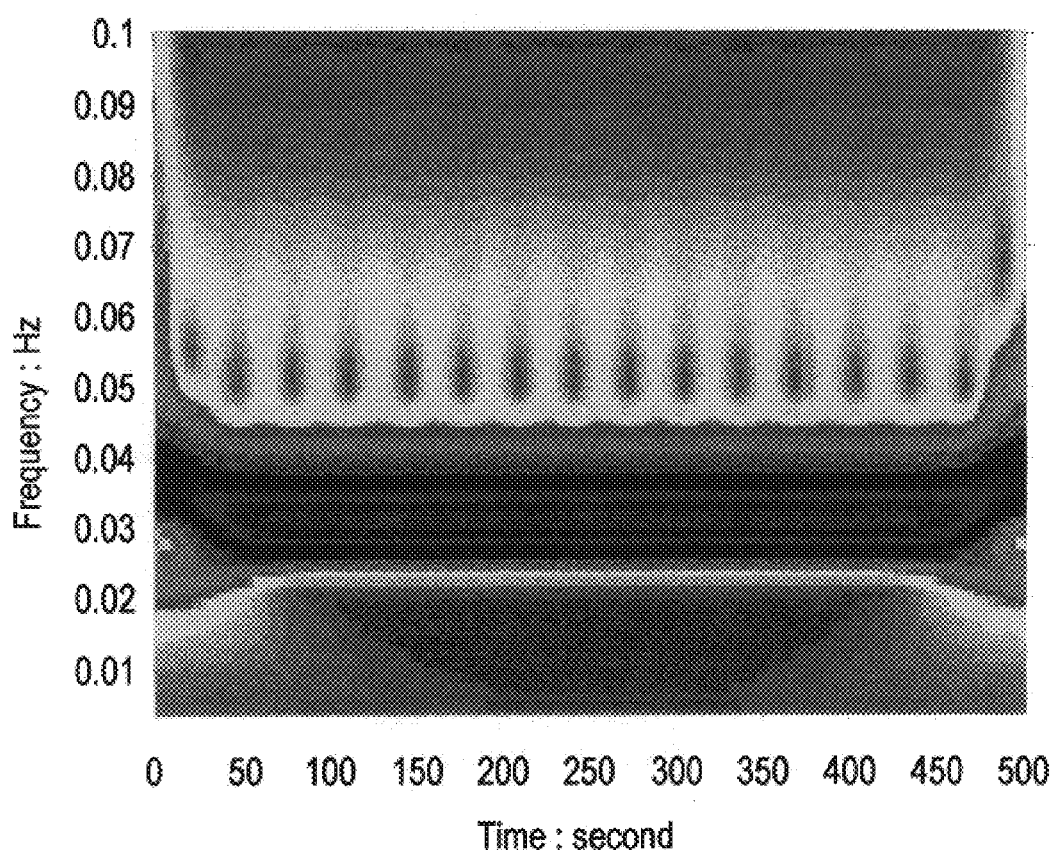
FIG. 18(c) is a conventional Morlet Wavelet spectrum of the Stokes wave shown in FIG. 18(a)

Processed with computer implemented EMD, this data yields only one IMF component as shown in FIG. 18(b), with a constant offset component (not shown). Although this wave has only one characteristic scale or IMF, the Wavelet analysis result shown in FIG. 18(c). FIG. 18(c) has many harmonics with two visible bands of energy corresponding to the highest order of approximations of the possible harmonics.

Figure 18D:
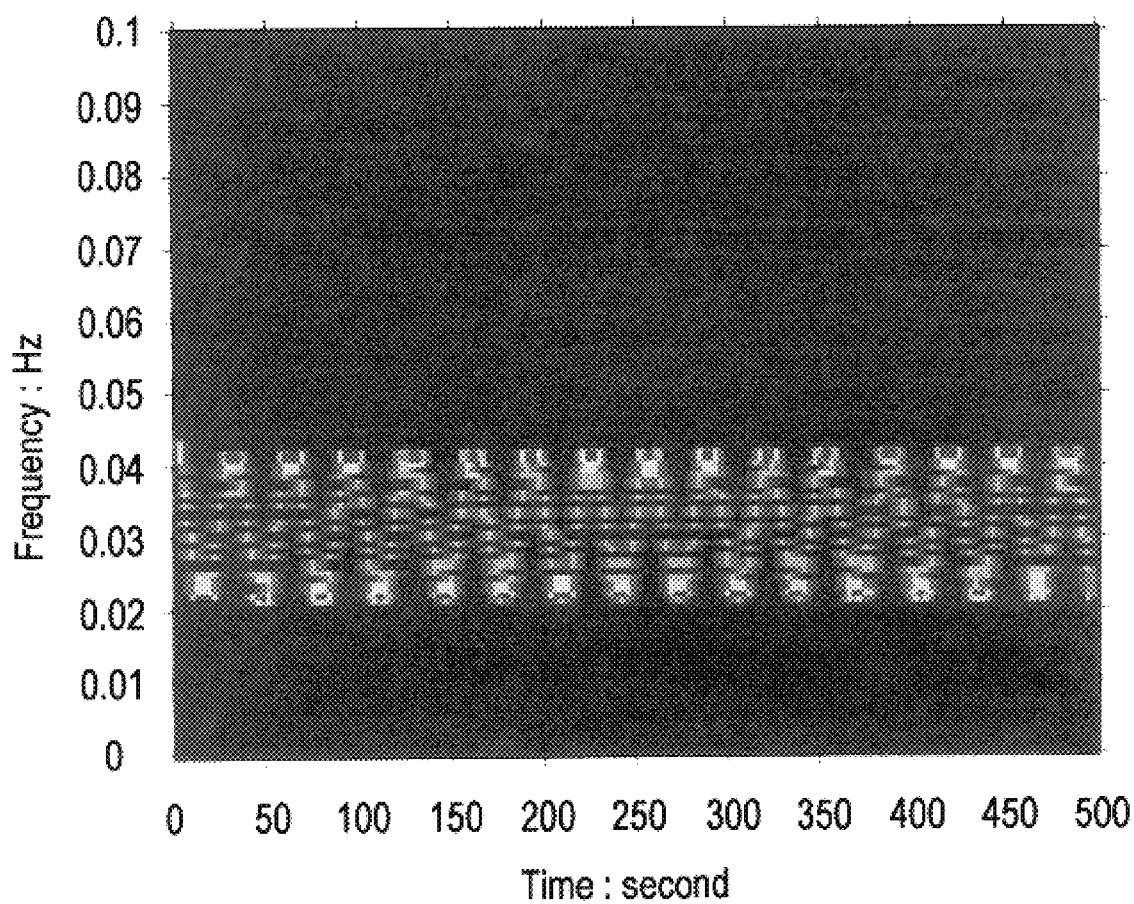
FIG. 18(d) is the Hilbert Spectrum generated by the invention from the Stokes wave shown in FIG. 18(a).

In contrast, the IMF data can be processed by the inventive method to give the Hilbert Spectrum shown in FIG. 18(d). The Hilbert Spectrum has only one frequency band centered around 0.03 Hz, the fundamental frequency of the wave train, but there is an intra-wave frequency modulation with a magnitude range of 0.02 to 0.04 Hz as the model truly represents. This intra-wave frequency modulation has been totally ignored in the past, for the traditional definition of frequency is based on the reciprocal of periodicity and Fourier Analysis.

Instantaneous Energy Density

Furthermore, the computer implemented method may also calculate the instantaneous energy density in step 150. The instantaneous energy density, IE, is defined as:

$$IE(t) = \int_\omega H^2(\omega, t) d\omega \qquad (24)$$

Still further, this instantaneous energy density depends on time. Therefore, the IE can be used to check energy fluctuations.

Stationarity

To quantitatively measure the stationarity of a physical signal, the invention utilizes step 165 to calculate various stationarity measurements. Before introducing the preferred stationarity measurements, a brief review of conventional stationarity measurements is presented.

The classic definitions of stationarity are dichotomous: a process is either stationary or nonstationary. This crude definition is only qualitative in nature. Such definitions are both overly stringent and useless at the same time: few data sets can satisfy the rigor of these definitions; consequently, no one even bothers using them to check stationarity of the signal. As a result, data as nonstationary as earthquake and seismological signals are routinely treated as stationary (see, for example, Hu, et al., 1996., *Earthquake Engineering.* Chapman & Hall, London).

Sometimes, for some obviously nonstationary data, two less stringent definitions are invoked: piece-wise stationary and asymptotically stationary. These definitions are still dichotomous.

To quantify the statistical processes further, an index is needed to give a quantitative measure of how far the process deviates from stationarity. A prerequisite for such a definition is a method to present the data in the frequency-time space.

With the energy-frequency-time distribution (Hilbert Spectrum) described above, stationarity of the physical signal may be quantitatively determined. Therefore, the invention introduces an index of stationarity as follows and calculates a Degree of Stationarity in step 165.

The first step in defining the Degree of Stationarity, $DS(\omega)$, is to find the mean marginal spectrum, $n(\omega)$, as $$n(\omega) = 1/T h(\omega) \qquad (25)$$

Then, the Degree of Stationarity may be defined as:

$$DS(\omega) = \frac{1}{T} \int_0^T \left(1 - \frac{H(\omega, t)}{n(\omega)}\right)^2 dt, \qquad (26)$$

Again, the value of $DS(\omega)$ can be determined by the computer. Therefore, the specialized computer 410 according to the invention can be treated as a stationary meter.

For a stationary process, the Hilbert spectrum cannot be a function of time. Then, the Hilbert Spectrum will consist of only horizontal contour lines and $DS(\omega)$ will then be identically zero. Only under this condition will the marginal spectrum be identical to the Fourier spectrum, then the Fourier spectrum will also make physical sense. On the other hand, if the Hilbert spectrum depends on time, the index will not be zero, then the Fourier spectrum will cease to make physical sense.

Figure 17A:
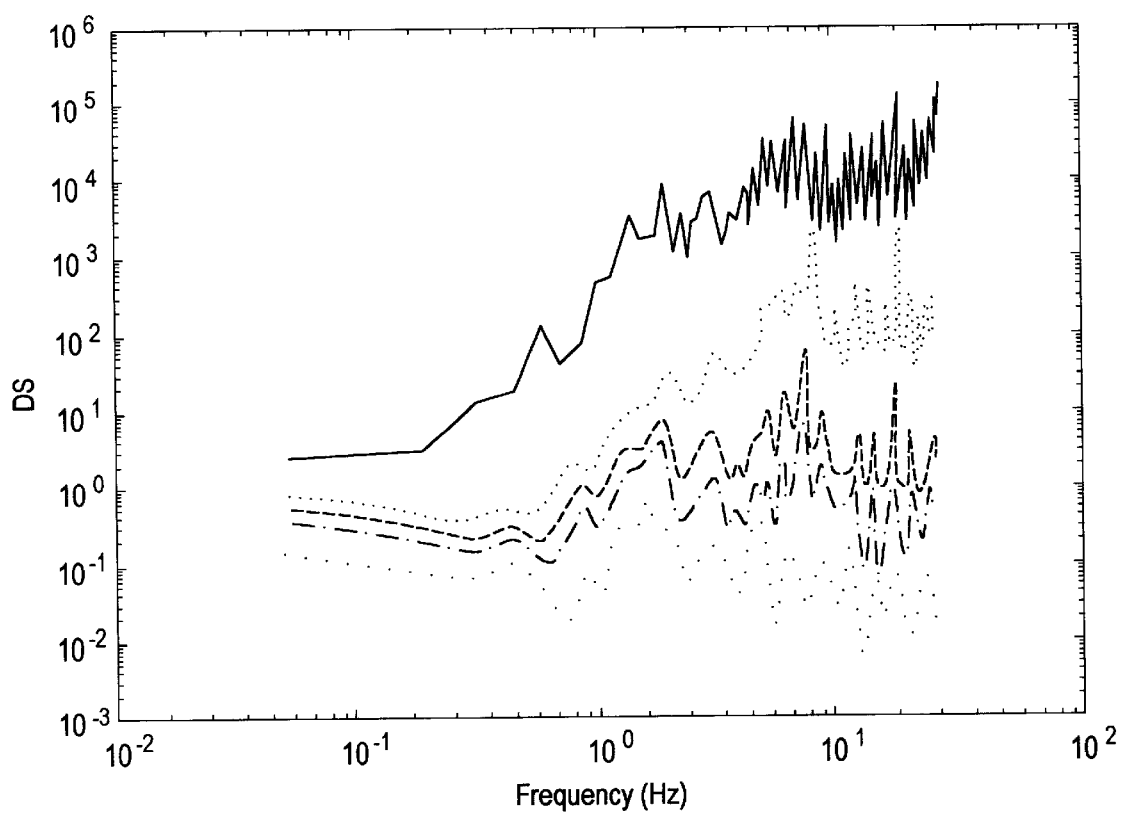
FIG. 17(a) is a graph illustrating the Degree of Stationarity and Degree of Statistical Stationarity which were generated from the wind speed signal of FIG. 4(a) with time averages of 10, 50, 100 and 300.
Figure 17B:
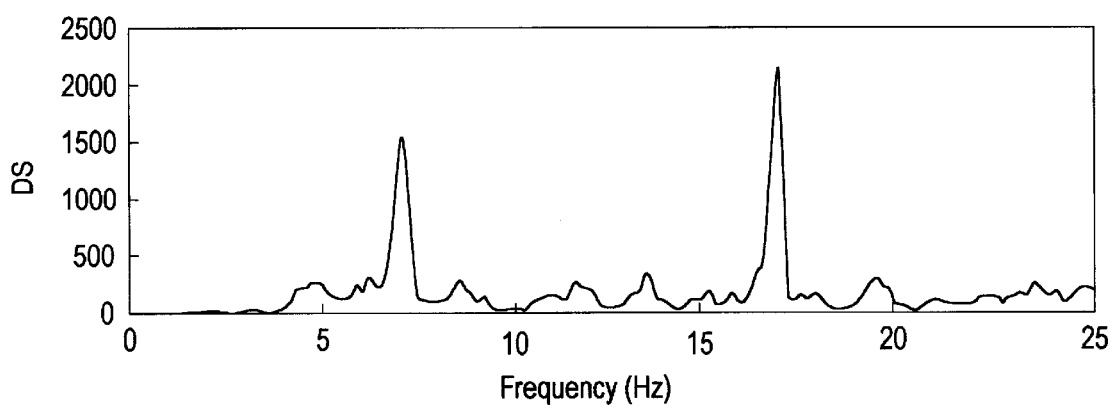
FIGS. 17(b) and (c) are sections of the wind speed data that was used by the invention to produce the Degree of Stationarity shown in FIG. 17(a)
Figure 17C:
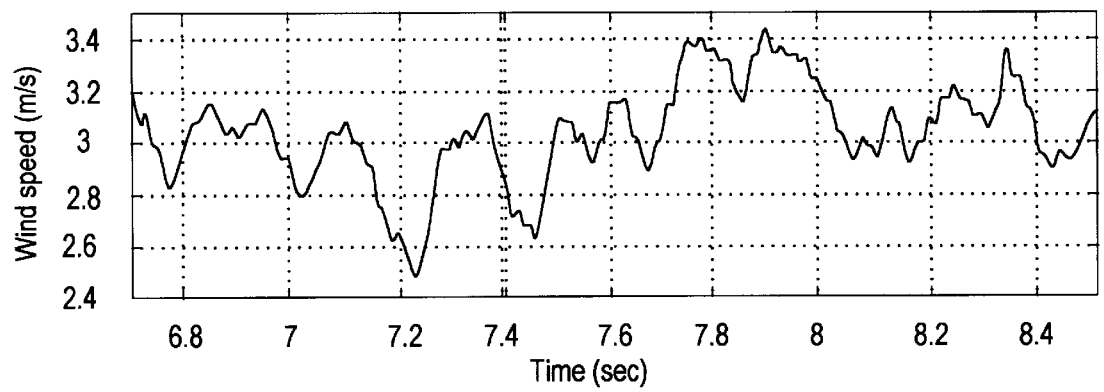

In general, the higher the index value, the more nonstationary is the process. The DS for the wind data is shown in FIG. 17(*a*). As the index shows, the data are highly nonstationary especially for the high frequency components.

Eq. (26) defines the stationarity as a function of frequency. This is necessary because certain frequency components can be nonstationary while other components remain stationary. An example is sporadic riding wind-generated waves on otherwise uniform swell: the low frequency swell component is stationary, while the high frequency wind waves are intermittent, and hence nonstationary.

The degree of stationarity can also be a function of time implicitly, for the definition depends on the time length of integration in Eq. (26). Therefore, a process can be piecewise stationary. On the other hand, for a singular outburst in an otherwise stationary signal, the process can be regarded as almost stationary if a long time integral is performed, but nonstationary the integral only encompasses the immediate neighborhood of the outburst.

Stationarity can be a complicated property of the process: for any signal shorter than a typical long wave period, the process may look transient. Yet as the signal length gets longer, the process can have many longer wave periods and becomes stationary. On the other hand, the signal can be locally stationary while in a long time sense nonstationary. An index is therefore not only useful but also necessary to quantify the process and give a measure of the stationarity.

The invention also calculates a Degree of Statistic Stationarity in step 165. The degree of stationarity defined in Eq. (26) can be modified slightly to include statistically stationary signals, for which the Degree of Statistic Stationarity, $DSS(\omega, \Delta T)$, is defined as $$DSS(\omega, \Delta T) = \frac{1}{T} \int_0^T \left(1 - \frac{\overline{H(\omega, t)}}{n(\omega)}\right)^2 dt, \qquad (27)$$

where the over-line indicates averaging over a definite but shorter time span, $\Delta T$, than the overall time duration of the data, T. For periodic motions, the $\Delta T$ can be the period. Such a time scale, however, is hard to define precisely for high dimensional, nonstationary dynamic systems.

Even with this difficulty, the definition for DSS could be more useful in characterizing random variables from natural phenomena. Furthermore, DSS will depend on both frequency and the averaging time span. For the wind data taken as an example, the DSS is given in FIG. 17(*a*) with $\Delta T=10$, 50, 100, and 300 time steps respectively. The results show that while the high frequency components are nonstationary, they can still be statistically stationary. Two frequency bands at 7 and 17 Hz are highly nonstationary as the DSS averaged at 100 time steps shown in FIG. 17(*b*). These components are intermittent as can be seen in the IMF components and the marginal spectrum. A section of the original wind data is also plotted in FIG. 17(*c*) to demonstrate that there are indeed prominent 7 and 17 Hz time scale oscillations.

Display of Selected Results

The invention displays various results of the above-described computer implemented method in step 190. These displays are extremely useful in analyzing the underlying physics of the physical phenomenon being studied as described above. Furthermore, particular examples of these displays and the increased understanding of the underlying physics which these displays permit are discussed in the following section.

For example, the invention generates various Hilbert spectra displays in the display step 190. As mentioned above, both color coded maps and contour maps may be employed to display the Hilbert spectra in display step 190. In addition, the color coded maps convey information to the operator in a uniquely accessible way permitting a more thorough and deeper understanding of the physical phenomenon and may be considered as necessary to analyze some physical phenomena.

The displays generated by the invention in display step 190 are central to the invention because they allow an operator to analyze the underlying physics of the physical phenomenon being studied.

The display step 190 outputs displays to display 450. As mentioned above, display 450 includes devices such as a cathode ray tube and a flat panel display. As an alternative, display step 290 may generate a hard copy output by utilizing printer 460 or may send the generated display to output device 470.

Alternative Embodiments

As described above, the invention constructs upper and lower envelopes 20, 30 with a cubic spline in steps 210 and 230, respectively and in step 560. This cubic spline fitting, however, has both overshoot and undershoot problems. These problems can be alleviated by using sore sophisticated spline methods, such as the taut spline in which the tension of the spline curve can be adjusted.

Another alternative is higher-order spline fitting. Although such higher-order spline fitting may be more accurate, it will, however, introduce more inflection points or extrema, and consume more computing time. Therefore, it is not recommended as a standard operation. Only in special cases, it may be tried.

As the spline fitting procedure is time consuming, more efficient methods can be devised by using simple mean values of successive extrema instead of computing the envelope-mean. In this way, only one spline fitting is required rather than two. Although this alternative is easier and faster to implement, the shortcomings are more severe amplitude averaging effects when the neighboring extrema are of different magnitudes. The successive-mean method will have a stronger forcing to reach uniform amplitudes, in which the true physics associated with amplitude will be destroyed. Therefore, the successive-mean method should only be applied where the amplitudes of the physical signal components are constants.

Either the envelope mean or the successive mean method, when applied with the requirement of absolute symmetry, will produce the absurd result of uniform amplitude IMF's. Therefore, the criteria in the Sifting Process should be chosen judiciously. One should avoid too stringent a criterion that we would get uniform amplitude IMF's. On the other hand, one should also avoid too loose a criterion that would produce components deviating too much from IMF's.

It is well known that the most serious problem of spline fitting is at the ends, where cubic splines can have wide swings if left unattended. As an alternative, the invention may utilize a method of adding characteristic waves at the ends of the data span. This confines the large swings successfully.

The method of adding characteristic waves is not conventional. In contrast, the conventional window that is often applied to fourier transform data results in loss of useful data. To avoid this data loss and to confine swings at the ends of the data span, the invention extends the data beyond the actual data span by adding three additional characteristic waves at each end of the data span.

The characteristic waves are defined by the last wave within the data span at the end of the data span. In other words, a characteristic wave is added to each end of the data span having an amplitude and period matching the last wave within the data span. This characteristic wave is a sinusoidal waveform that is extended three sinusoidal wave periods beyond the data span at each end. This process is repeated at the other end of the data span. In this way, spline fitting at the end of the data span, which can otherwise have a wide swing, is confined. In other words, by adding the extra characteristic waves at the ends beyond the data span, the spline curve will be tied down so that it will not have wild or excessive swings that would otherwise corrupt the data processing and analysis that utilizes these cubic splines.

Other than the spline fitting, the Hilbert transform may also have end effects. Because the first and the last points of the data are usually of different values, the Fourier transform will introduce additional components to bridge over the difference resulting in the well-known Gibbs phenomena. To eliminate it in the Fourier transform, various windows have been adopted (see, for example, Brigham, 1974, *"The fast Fourier Transform"*, Prentice-Hall, Englewood Cliffs, N.J.).

Instead of a window which will eliminate some useful data at the end, the invention again adds two characteristic waves at either end. These waves all start from zero at the beginning, and end at zero at the end. Thus, the annoying Gibbs phenomena are greatly reduced.

Still further, the Hilbert transform needs over-sampled data to define the instantaneous frequency precisely. In Fourier analysis, the Nyquist frequency is defined by two points per wave, but the frequency is defined for a wave covering the whole data span. In the invention, the instantaneous frequency is defined through a differentiation process, and thus more data points will help defining the frequency more accurately. Based on the inventor's experience, a minimum number of data points to define a frequency is five (or four $\Delta t$'s ). The lack of fine time steps can be alleviated through interpolating more points between available data. As a spline interpretation. would also not create nor annihilate scales, it can also be used for the interpolation when the data is very jagged from under-sampled data. The smoothed data though have a longer length and are sometimes easier to process. The interpolation may give better frequency definition.

Particular Limitations of The Invention

The dependence on the existence of scale for mode definition has one limitation: the decomposition method cannot separate signals when their frequencies are too close. In this case, there would not be any characteristic scale: therefore, physically they are identical. This may be the most severe limitation of the invention, but even here, the invented method can still work as well as the Fourier Analysis.

Particular Advantages of The Invention

The strength of the EMD method should be reiterated. EMD is built on the idea of identifying the various scales in the data which are quantities of great physical significance. Therefore, in the local extrema and curvature extrema Sifting Processes, orthogonality is not a consideration, but scales are. Since orthogonal decomposition is a characteristic for linear systems, violating this restriction is not a shortcoming but a breakthrough. Therefore, the decomposed IMF's may or may not be orthogonal. As such, this method can be applied to nonlinear data. Though the IMF's in most cases are practically orthogonal, it is a coincidence rather than a requirement of the EMD.

Another advantage of the method is the effective use of all the data representing the physical phenomenon. In the Sifting Processes, the longest scale is defined by the full length of the data. As a result, EMD can define many long period oscillations. As is well known, the Hilbert transform without sifting tends to identify the highest frequency (Boashash, 1992, *"Estimating and Interpreting the Instantaneous Frequency of a Signal, Part I: Fundamentals"*, Proc. IEEE, 80, 520–538.), the extraction of the long period components is indeed a new feature of the EMD.

Finally, though the EMD method will give IMF components, the individual component does not guarantee well-defined physical meaning. This is true for all decompositions, especially for the methods with a priori basis. In most cases, however, the IMF's do carry physical significance. Great caution should be exercised in making such attempts. The rule for interpreting the physical significance of the IMF's is that the scales should be clearly separated. Together with the Hilbert spectrum, the totality of the presentation should give a much more detailed representation of the physical processes than conventional methods.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An article of manufacture, comprising:
   a computer-usable medium including computer-readable program code means, embodied therein, for causing a computer to analyze a physical signal representative of a physical phenomenon, the computer-readable program code means comprising:
      computer-readable program code means for inputting the physical signal;
      computer-readable program code means for recursively sifting said signal via Empirical Mode Decomposition to extract an intrinsic mode function indicative of an intrinsic oscillatory mode in a physical phenomenon; and
      computer-readable program code means for displaying the intrinsic mode function on a display,
      said recursive sifting means identifying extrema in said signal from curvature extrema.

2. An apparatus for analyzing a physical signal representative of a physical phenomenon, comprising:
   an input device inputting said signal;
   a sifter recursively performing a recursive curvature extrema Sifting Process on the signal using Empirical Mode Decomposition to extract an intrinsic mode function indicative of an intrinsic oscillatory mode in the physical phenomenon, said sifter identifying extrema in the signal from curvature extrema; and,
   a display displaying the intrinsic mode function.

3. The apparatus according to claim 2 wherein said sifter identifies curvature extrema in the signal by calculating a curvature function of the signal, finding extrema in the curvature function, and determining corresponding curvature extrema in the signal corresponding to the extrema in the curvature function.

4. The apparatus according to claim 2 wherein said sifter identifies extrema in the signal from curvature extrema and local extrema during a first recursion of said recursive Sifting Process and from local extrema during subsequent recursions of said recursive curvature extrema Sifting Process.

5. The apparatus according to claim 2, said sifter including:
   an extrema identifier identifying extrema signal,
   an envelop constructor constructing an upper envelope and a lower envelop of the signal from the respective maxima and minima in the identified extrema,
   an envelope mean determiner determining an envelope mean from the upper and lower envelopes,
   a component signal generator generating a component signal by subtracting the envelope mean from the signal,
   wherein the component signal is treated as the signal during said sifters next recursive curvature extrema Sifting Process, and
   wherein said sifter recursively performs the curvature extrema Sifting Process until successive component signals are substantially equal.

6. The apparatus according to claim 5, further comprising:
   a comparator comparing the component signal against a definition of intrinsic mode functions,
   said sifter recursively performing the curvature extrema Sifting Process until said comparator determines that three successive component signals satisfy the definition of intrinsic mode functions.

7. The apparatus according to claim 5, further comprising:
   a standard deviation calculator calculating a standard deviation between successive component functions; and,
   a comparator comparing the standard deviation to a predetermined threshold value,
   said sifter recursively performing the curvature extrema Sifting Process until the standard deviation exceeds the predetermined threshold value.

8. The apparatus according to claim 5, further comprising:
   a tester testing extrema for an intermittency in the signal including testing maxima and minima of the extrema;
   said envelope constructor constructing the upper envelope step by treating the maxima failing said tester as minima values to construct the upper envelope of the signal; and,
   said envelope constructor constructing the lower envelope by treating the minima failing said tester as maxima to construct the lower envelope of the signal.

9. The apparatus according to claim 2, further comprising:
   a residual signal generator generating a residual signal by subtracting the intrinsic mode function from the signal;
   wherein the residual signal is treated as the signal during a next iteration of the curvature extrema Sifting Process performed by said sifter;
   said sifter identifying extrema in the signal from curvature extrema and local extrema at each iteration of the recursive curvature extrema Sifting Process and from local extrema at each recursion of the recursive curvature extrema Sifting Process,
   an iterator iterating the curvature extrema Sifting Process performed by said sifter to generate a second intrinsic mode function indicative of a second intrinsic oscillatory mode in the physical phenomenon.

10. The apparatus according to claim 9, wherein said sifter continues to perform said curvature extrema Sifting Process to generate an n-th intrinsic mode function indicative of an n-th intrinsic oscillatory mode in the physical phenomenon until the residual signal is monotonically increasing or decreasing.

11. The apparatus according to claim 9, wherein said sifter continues to perform said curvature extrema Sifting Process to generate an n-th intrinsic mode function indicative of an n-th intrinsic oscillatory mode in the physical phenomenon until the residual signal has less than two local extrema.

12. The apparatus according to claim 11, further comprising:
a Hilbert Spectrum generator applying a Hilbert transform to the intrinsic mode function to generate a Hilbert spectrum.

13. The apparatus according to claim 12, further comprising:
a marginal spectrum calculator calculating a marginal spectrum from the Hilbert spectrum.

14. The apparatus according to claim 12, further comprising:
an instantaneous frequency calculator calculating an instantaneous frequency from transformed intrinsic mode functions.

15. The apparatus according to claim 12, further comprising:
an instantaneous energy density calculator calculating an instantaneous energy density from the transformed intrinsic mode functions.

16. The apparatus according to claim 12, further comprising:
a stationarity calculator calculating a measure of stationarity from the transformed intrinsic mode functions.

17. The apparatus according to claim 2, further comprising:
a Hilbert transformer transforming the intrinsic mode function with a Hilbert transform.

18. The apparatus according to claim 2,
said input device including:
a sensor detecting the physical phenomenon to generate an analog signal; and,
an analog to digital convertor converting the analog signal to a digital signal.

19. The apparatus according to claim 2, wherein the physical phenomenon is a geophysical phenomenon.

20. A computer implemented method of analyzing a physical signal representative of a physical phenomenon, comprising the computer implemented steps of:
inputting the physical signal representative of the physical phenomenon;
recursively sifting the physical signal via Empirical Mode Decomposition to extract an intrinsic mode function indicative of an intrinsic oscillatory mode in the physical phenomenon;
said recursive sifting step identifying extrema in the physical signal from curvature extrema wherein said recursive sifting step identifies curvature extrema in the signal by calculating a curvature function of the signal, finding extrema in the curvature function, and determining corresponding curvature extrema in the signal corresponding to the extrema in the curvature function; and,
displaying the intrinsic mode function.

21. The computer implemented method according to claim 20, further comprising the steps of:
detecting a physical phenomenon with a sensor to generate an analog signal, and
converting the analog signal to a digital signal representative of the phenomenon.

22. The computer implemented method representative of a physical phenomenon according to claim 20, wherein the physical phenomenon is a geophysical phenomenon.

23. The computer implemented method according to claim 20, further comprising the step of:
transforming the intrinsic mode function with a Hilbert transform.

24. The computer implemented method according to claim 20,
said recursive sifting step identifying extrema in the signal from curvature extrema and local extrema during a first recursion of said recursive sifting step and from local extrema during subsequent recursions of said recursive sifting step.

25. The computer implemented method according to claim 24, said recursive sifting step including the substeps of:
identifying extrema in said signal,
constructing upper and lower envelopes of the signal from the respective maxima and minima of the identified extrema,
determining an envelope mean from the upper and lower envelopes,
generating a component signal by subtracting the envelope mean from the signal, and
treating the component signal as the signal;
said recursive sifting step being recursively performed until successive component signals are substantially equal.

26. The computer implemented method according to claim 25, further comprising the step of:
testing the component signal against a definition of intrinsic mode functions,
said recursive sifting step being recursively performed until said testing step determines that three successive component signals satisfy the definition of intrinsic mode functions.

27. The computer implemented method according to claim 25, further comprising the steps of:
computing a standard deviation between successive component functions,
comparing the standard deviation to a predetermined threshold value,
said sifting step being recursively performed until said comparing step determines that the standard deviation exceeds the predetermined threshold value.

28. The computer implemented method according to claim 25, said recursive sifting step further including the substeps of:
testing the extrema for an intermittency in said signal including testing maxima and minima of the extrema;
said constructing step constructing the upper envelope step by treating maxima failing said testing step as minima to construct the upper envelope of the signal;
said constructing step constructing the lower envelope by treating minima failing said testing step as maxima to construct the lower envelope of the signal.

29. The computer implemented method according to claim 20, further comprising the steps of:
generating a residual signal by subtracting the intrinsic mode function from the signal;
treating the residual signal as the signal during a next iteration of said recursive sifting step;

identifying extrema in the signal from curvature extrema and local extrema at each iteration of said recursive sifting step and from local extrema at each recursion of said recursive sifting step, iterating said recursive sifting step to generate a second intrinsic mode function indicative of a second intrinsic oscillatory mode.

30. The computer implemented method according to claim 29, further comprising the step of:

continuing to perform said iterating step to generate an n-th intrinsic mode function indicative of an n-th intrinsic oscillatory mode until the residual signal is monotonically increasing or decreasing.

31. The computer implemented method according to claim 29, further comprising the step of:

continuing to perform said iterating step to generate an n-th intrinsic mode function indicative of an n-th intrinsic oscillatory mode until the residual signal has less than two extrema.

32. The computer implemented method according to claim 31, further comprising the step of:

applying a Hilbert transform to the intrinsic mode functions to generate a Hilbert spectrum.

33. The computer implemented method according to claim 32, further comprising the step of:

calculating a marginal spectrum from the Hilbert spectrum.

34. The computer implemented method according to claim 32, further comprising the step of:

calculating an instantaneous frequency from the transformed intrinsic mode functions.

35. The computer implemented method according to claim 34, further comprising the step of:

calculating an instantaneous energy density from the transformed intrinsic mode functions.

36. The computer implemented method according to claim 34, further comprising the step of:

calculating a measure of stationary from the transformed intrinsic mode functions.

* * * * *